(12) United States Patent
Takagi et al.

(10) Patent No.: US 12,296,740 B2
(45) Date of Patent: May 13, 2025

(54) VEHICLE

(71) Applicant: Sony Group Corporation, Tokyo (JP)

(72) Inventors: Noriaki Takagi, Tokyo (JP); Yosuke Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 368 days.

(21) Appl. No.: 17/781,396

(22) PCT Filed: Dec. 11, 2020

(86) PCT No.: PCT/JP2020/046266
§ 371 (c)(1),
(2) Date: Jun. 1, 2022

(87) PCT Pub. No.: WO2021/131789
PCT Pub. Date: Jul. 1, 2021

(65) Prior Publication Data
US 2023/0001845 A1    Jan. 5, 2023

(30) Foreign Application Priority Data

Dec. 26, 2019   (JP) .................................. 2019-235747

(51) Int. Cl.
| | | |
|---|---|---|
| *B60Q 1/00* | (2006.01) | |
| *B60Q 1/04* | (2006.01) | |
| *B60Q 1/24* | (2006.01) | |
| *B60Q 1/34* | (2006.01) | |
| *B60Q 1/50* | (2006.01) | |

(Continued)

(52) U.S. Cl.
CPC ......... *B60Q 1/0035* (2013.01); *B60Q 1/0023* (2013.01); *B60Q 1/04* (2013.01); *B60Q 1/247* (2022.05); *B60Q 1/346* (2013.01); *B60Q 1/507* (2022.05); *B60R 25/01* (2013.01);

(Continued)

(58) Field of Classification Search
None
See application file for complete search history.

(56) References Cited

U.S. PATENT DOCUMENTS

| | | |
|---|---|---|
| 2016/0250963 A1 | 9/2016 | Reuschel |
| 2017/0088035 A1 | 3/2017 | Williams |
| 2017/0321859 A1 | 11/2017 | Zawacki |

FOREIGN PATENT DOCUMENTS

| | | |
|---|---|---|
| CN | 110053583 A | 7/2019 |
| DE | 102016114752 A1 | 2/2017 |

(Continued)

OTHER PUBLICATIONS

International Search Report and Written Opinion mailed on Feb. 16, 2021, received for PCT Application PCT/JP2020/046266, Filed on Dec. 11, 2020, 12 pages including English Translation.

*Primary Examiner* — Ashok Patel
(74) *Attorney, Agent, or Firm* — XSENSUS, LLP

(57) ABSTRACT

The present technology relates to a vehicle that enables to improve designability while avoiding deterioration of safety and functionality of the vehicle.

The vehicle includes: a front line extending in a vehicle width direction on a front surface of a body; and a headlight arranged on left and right of the front surface, divided vertically by the front line, and configured to output a low beam from a portion above the front line and output a high beam from a portion below the front line. The present technology can be applied to, for example, a vehicle.

25 Claims, 36 Drawing Sheets

(51) Int. Cl.
*B60R 25/01* (2013.01)
*B60R 25/20* (2013.01)

(52) U.S. Cl.
CPC .......... *B60R 25/20* (2013.01); *B60Q 2500/30* (2022.05); *B60Q 2900/40* (2022.05)

(56) References Cited

FOREIGN PATENT DOCUMENTS

| | | |
|---|---|---|
| DE | 102018206087 A1 | 10/2019 |
| EP | 2065253 A2 | 6/2009 |
| GB | 2337321 A | 11/1999 |
| JP | 61-119444 A | 6/1986 |
| JP | 2007-99172 A | 4/2007 |
| JP | 2008-17227 A | 1/2008 |
| JP | 2008-230568 A | 10/2008 |
| JP | 2014-8877 A | 1/2014 |
| JP | 2017-56829 A | 3/2017 |
| JP | 2017-81249 A | 5/2017 |
| JP | 2018-3469 A | 1/2018 |
| JP | 2018-176885 A | 11/2018 |
| JP | 2018-197010 A | 12/2018 |
| JP | 2019-16840 A | 1/2019 |
| JP | 6809946 | * 12/2020 |
| WO | 2019/059026 A1 | 3/2019 |
| WO | 2019/111565 A1 | 6/2019 |

* cited by examiner

VEHICLE

CROSS-REFERENCE TO RELATED APPLICATIONS

The present application is based on PCT filing PCT/JP2020/046266, filed Dec. 11, 2020, which claims priority to Japanese Patent Application No. 2019-235747, filed Dec. 26, 2019, the entire contents of each are incorporated herein by reference.

TECHNICAL FIELD

The present technology relates to a vehicle, and more particularly to a vehicle adapted to improve designability.

BACKGROUND ART

Conventionally, improvement in designability of a vehicle has been demanded. For example, a shape of a headlight, which is one of important elements of design of a vehicle, has been devised (see, for example, Patent Document 1).

CITATION LIST

Patent Document

Patent Document 1: Japanese Patent Application Laid-Open No. 2018-176885

SUMMARY OF THE INVENTION

Problems to be Solved by the Invention

Whereas, it is not desirable that safety and functionality are deteriorated with emphasis on vehicle designability.

The present technology has been made in view of such a situation, and an object is to improve designability while avoiding deterioration of safety and functionality of a vehicle.

Solutions to Problems

A vehicle according to one aspect of the present technology includes: a front line extending in a vehicle width direction on a front surface of a body; and a headlight arranged on left and right of the front surface, divided vertically by the front line, and configured to output a low beam from a portion above the front line and output a high beam from a portion below the front line.

According to one aspect of the present technology, in a headlight, a low beam is outputted from a portion above a front line extending in a vehicle width direction on a front surface of a body, and a high beam is outputted from a portion below the front line.

BRIEF DESCRIPTION OF DRAWINGS

FIG. 21 is a view illustrating an example of a light emission pattern of a light at a time of power-on.

FIG. 22 is a view illustrating an example of a light emission pattern of a light at a time of power-on.

FIG. 24 is a view illustrating an example of a light emission pattern of a light during driving and when the headlight is turned on.

MODE FOR CARRYING OUT THE INVENTION

Hereinafter, an embodiment for implementing the present technology will be described. The description will be given in the following order.
1. Configuration example of vehicle control system
2. Embodiment
3. Modified example
4. Other

1. Configuration Example of Vehicle Control System

Figure 1:
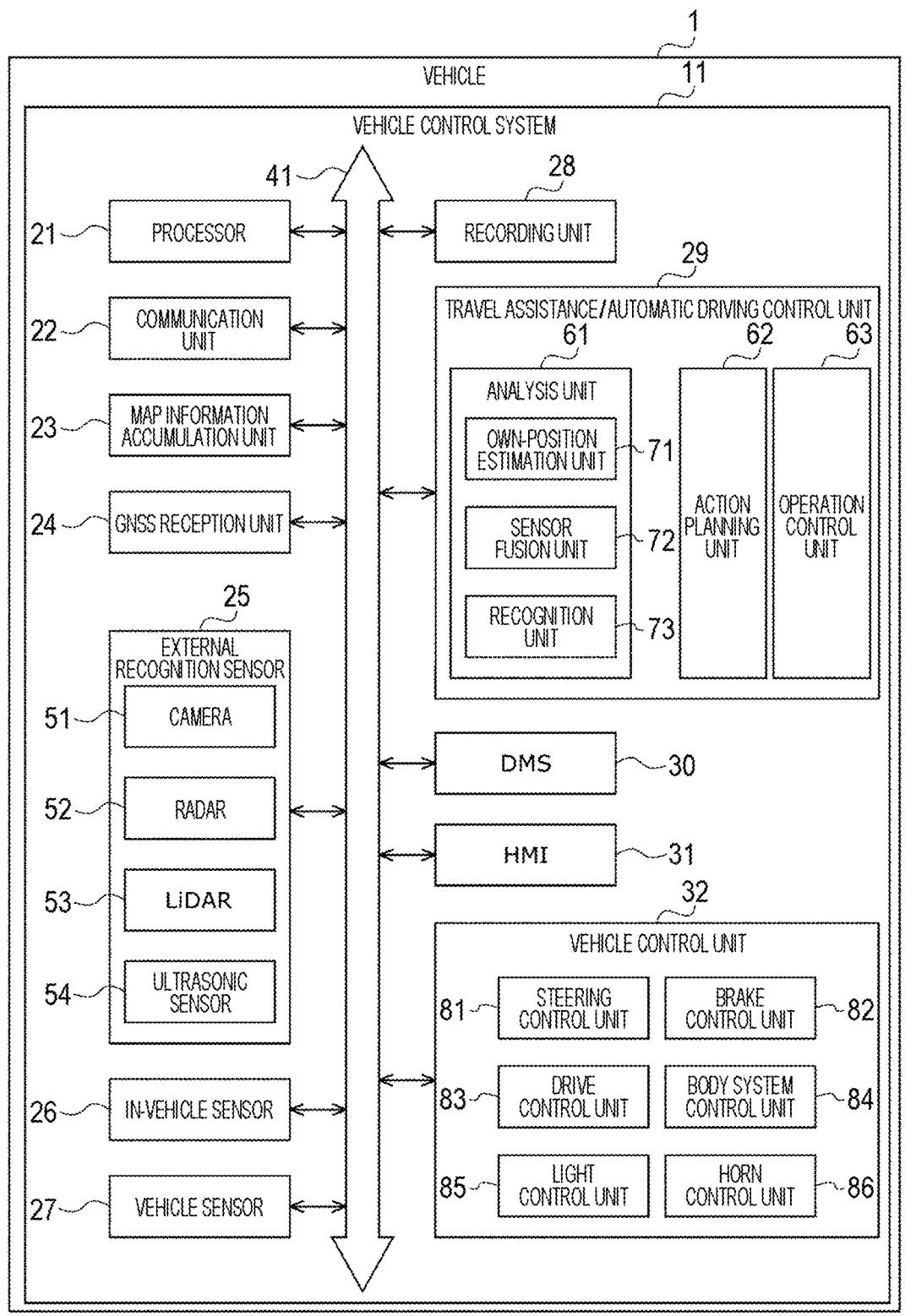
FIG. 1 is a block diagram illustrating a configuration example of a vehicle control system.

FIG. 1 is a block diagram illustrating a configuration example of a vehicle control system 11, which is an example of a mobile device control system to which the present technology is applied.

The vehicle control system 11 is provided in a vehicle 1 and performs processing related to travel assistance and automatic driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the driver monitoring system (DMS) 30, the human machine interface (HMI) 31, and the vehicle control unit 32 are connected to each other via a communication network 41. The communication network 41 includes, for example, a bus, an in-vehicle communication network conforming to any standard such as a controller area network (CAN), a local interconnect network (LIN), a local area network (LAN), FlexRay (registered trademark), or Ethernet (registered trademark), and the like. Note that there is also a case where each unit of the vehicle control system 11 is directly connected by, for example, short-range wireless communication (near field communication (NFC)), Bluetooth (registered trademark), or the like without via the communication network 41.

Note that, hereinafter, in a case where each unit of the vehicle control system 11 communicates via the communication network 41, the description of the communication network 41 is to be omitted. For example, in a case where the processor 21 and the communication unit 22 perform communication via the communication network 41, it is simply described that the processor 21 and the communication unit 22 perform communication.

The processor 21 includes various processors such as, for example, a central processing unit (CPU), a micro processing unit (MPU), and an electronic control unit (ECU). The processor 21 controls the entire vehicle control system 11.

The communication unit 22 communicates with various types of equipment inside and outside the vehicle, other vehicles, servers, base stations, and the like, and transmits and receives various data. As the communication with the outside of the vehicle, for example, the communication unit 22 receives, from the outside, a program for updating software for controlling an operation of the vehicle control system 11, map information, traffic information, information around the vehicle 1, and the like. For example, the communication unit 22 transmits information regarding the vehicle 1 (for example, data indicating a state of the vehicle 1, a recognition result by a recognition unit 73, and the like), information around the vehicle 1, and the like to the outside. For example, the communication unit 22 performs communication corresponding to a vehicle emergency call system such as an eCall.

Note that a communication method of the communication unit 22 is not particularly limited. Furthermore, a plurality of communication methods may be used.

As the communication with the inside of the vehicle, for example, the communication unit 22 performs wireless communication with in-vehicle equipment by a communication method such as wireless LAN, Bluetooth, NFC, or wireless USB (WUSB). For example, the communication unit 22 performs wired communication with in-vehicle equipment through a communication method such as a universal serial bus (USB), a high-definition multimedia interface (HDMI, registered trademark), or a mobile high-definition link (MHL), via a connection terminal (not illustrated) (and a cable if necessary).

Here, the in-vehicle equipment is, for example, equipment that is not connected to the communication network 41 in the vehicle. For example, mobile equipment or wearable equipment carried by a passenger such as a driver, information equipment brought into the vehicle and temporarily installed, and the like are assumed.

For example, the communication unit 22 uses a wireless communication method such as a fourth generation mobile communication system (4G), a fifth generation mobile communication system (5G), long term evolution (LTE), or dedicated short range communications (DSRC), to communicate with a server or the like existing on an external network (for example, the Internet, a cloud network, or a company-specific network) via a base station or an access point.

For example, the communication unit 22 uses a peer to peer (P2P) technology to communicate with a terminal (for example, a terminal of a pedestrian or a store, or a machine type communication (MTC) terminal) existing near the own vehicle. For example, the communication unit 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication unit 22 receives an electromagnetic wave transmitted by a road traffic information communication system (vehicle information and communication system (VICS), registered trademark), such as a radio wave beacon, an optical beacon, or FM multiplex broadcasting.

The map information accumulation unit 23 accumulates a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map (also referred to as an advanced driver assistance system (ADAS) map), or the like. The dynamic map is, for example, a map including four layers of dynamic information, semi-dynamic information, semi-static information, and static information, and is supplied from an external server or the like. The point cloud map is a map including a point cloud (point group data). The vector map is a map in which information such as a lane and a position of a traffic light is associated with the point cloud map. The point cloud map and the vector map may be supplied from, for example, an external server or the like, or may be created by the vehicle 1 as a map for performing matching with a local map to be described later on the basis of a sensing result by a radar 52, a LiDAR 53, or the like, and may be accumulated in the map information accumulation unit 23. Furthermore, in a case where the high-precision map is supplied from an external server or the like, in order to reduce a communication capacity, for example, map data of several hundred meters square regarding a planned path on which the vehicle 1 will travel is acquired from a server or the like.

The GNSS reception unit 24 receives a GNSS signal from a GNSS satellite, and supplies to the travel assistance/automatic driving control unit 29.

The external recognition sensor 25 includes various sensors used for recognizing a situation outside the vehicle 1, and supplies sensor data from each sensor to each unit of the vehicle control system 11. Any type and number of sensors included in the external recognition sensor 25 may be adopted.

For example, the external recognition sensor 25 includes a camera 51, the radar 52, the light detection and ranging or laser imaging detection and ranging (LiDAR) 53, and an ultrasonic sensor 54. Any number of the camera 51, the radar 52, the LiDAR 53, and the ultrasonic sensor 54 may be adopted, and an example of a sensing area of each sensor will be described later.

Note that, as the camera 51, for example, a camera of any image capturing system such as a time of flight (ToF) camera, a stereo camera, a monocular camera, or an infrared camera is used as necessary.

Furthermore, for example, the external recognition sensor 25 includes an environment sensor for detection of weather, a meteorological state, a brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone to be used to detect sound around the vehicle 1, a position of a sound source, and the like.

The in-vehicle sensor 26 includes various sensors for detection of information inside the vehicle, and supplies sensor data from each sensor to each unit of the vehicle control system 11. Any type and number of sensors included in the in-vehicle sensor 26 may be adopted.

For example, the in-vehicle sensor 26 includes a camera, a radar, a seating sensor, a steering wheel sensor, a microphone, a biological sensor, and the like. As the camera, for example, a camera of any image capturing system such as a ToF camera, a stereo camera, a monocular camera, or an infrared camera can be used. The biological sensor is provided, for example, in a seat, a steering wheel, or the like, and detects various kinds of biological information of a passenger such as the driver.

The vehicle sensor 27 includes various sensors for detection of a state of the vehicle 1, and supplies sensor data from each sensor to each unit of the vehicle control system 11. Any type and number of sensors included in the vehicle sensor 27 may be adopted.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a number of revolutions of an engine or a motor, an air pressure sensor that detects an air pressure of a tire, a slip rate sensor that detects a slip rate of a tire, and a wheel speed sensor that detects a rotation speed of a wheel. For example, the vehicle sensor 27 includes a battery sensor that detects a remaining amount and a temperature of a battery, and an impact sensor that detects an external impact.

The recording unit 28 includes, for example, a magnetic storage device such as a read only memory (ROM), a random access memory (RAM), and a hard disc drive (HDD), a semiconductor storage device, an optical storage device, a magneto-optical storage device, and the like. The recording unit 28 stores various programs, data, and the like used by each unit of the vehicle control system 11. For example, the recording unit 28 records a rosbag file including a message transmitted and received by a Robot Operating System (ROS) in which an application program related to automatic driving operates. For example, the recording unit 28 includes an Event Data Recorder (EDR) and a Data Storage System for Automated Driving (DSSAD), and records information of the vehicle 1 before and after an event such as an accident.

The travel assistance/automatic driving control unit 29 controls travel support and automatic driving of the vehicle 1. For example, the travel assistance/automatic driving control unit 29 includes an analysis unit 61, an action planning unit 62, and an operation control unit 63.

The analysis unit 61 performs analysis processing on a situation of the vehicle 1 and surroundings. The analysis unit 61 includes an own-position estimation unit 71, a sensor fusion unit 72, and the recognition unit 73.

The own-position estimation unit 71 estimates an own-position of the vehicle 1 on the basis of sensor data from the external recognition sensor 25 and a high-precision map accumulated in the map information accumulation unit 23. For example, the own-position estimation unit 71 generates a local map on the basis of sensor data from the external recognition sensor 25, and estimates the own-position of the vehicle 1 by performing matching of the local map with the high-precision map. The position of the vehicle 1 is based on, for example, a center of a rear wheel pair axle.

The local map is, for example, a three-dimensional high-precision map, an occupancy grid map, or the like created using a technique such as simultaneous localization and mapping (SLAM). The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in a unit of a grid. The occupancy state of the object is indicated by, for example, a presence or absence or a presence probability of the object. The local map is also used for detection processing and recognition processing of a situation outside the vehicle 1 by the recognition unit 73, for example.

Note that the own-position estimation unit 71 may estimate the own-position of the vehicle 1 on the basis of a GNSS signal and sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 performs detection processing and recognition processing of a situation outside the vehicle 1.

For example, the recognition unit 73 performs detection processing and recognition processing of a situation outside the vehicle 1 on the basis of information from the external recognition sensor 25, information from the own-position estimation unit 71, information from the sensor fusion unit 72, and the like.

Specifically, for example, the recognition unit 73 performs detection processing, recognition processing, and the like of an object around the vehicle 1. The detection processing of the object is, for example, processing of detecting a presence or absence, a size, a shape, a position, a movement, and the like of the object. The recognition processing of the object is, for example, processing of recognizing an attribute such as a type of the object or identifying a specific object. However, the detection processing and the recognition processing are not necessarily clearly divided, and may overlap.

For example, the recognition unit 73 detects an object around the vehicle 1 by performing clustering for classifying a point cloud on the basis of sensor data of the LiDAR, the radar, or the like for each cluster of point groups. As a result, a presence or absence, a size, a shape, and a position of the object around the vehicle 1 are detected.

For example, the recognition unit 73 detects a movement of the object around the vehicle 1 by performing tracking that is following a movement of the cluster of point groups classified by clustering. As a result, a speed and a traveling direction (a movement vector) of the object around the vehicle 1 are detected.

For example, the recognition unit 73 recognizes a type of the object around the vehicle 1 by performing object recognition processing such as semantic segmentation on an image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition unit 73 performs recognition processing of traffic rules around the vehicle 1 on the basis of a map accumulated in the map information accumulation unit 23, an estimation result of the own-position, and a recognition result of the object around the vehicle 1. By this processing, for example, a position and a state of a traffic light, contents of a traffic sign and a road sign, contents of a traffic regulation, a travelable lane, and the like are recognized.

For example, the recognition unit 73 performs recognition processing of a surrounding environment of the vehicle 1. As the surrounding environment to be recognized, for example, weather, a temperature, a humidity, a brightness, road surface conditions, and the like are assumed.

The action planning unit 62 creates an action plan of the vehicle 1. For example, the action planning unit 62 creates an action plan by performing processing of path planning and path following.

Note that the path planning (global path planning) is processing of planning a rough path from a start to a goal. This path planning is called track planning, and also includes processing of track generation (local path planning) that enables safe and smooth traveling in the vicinity of the vehicle 1, in consideration of motion characteristics of the vehicle 1 in the path planned by the path planning.

Path following is processing of planning an operation for safely and accurately traveling a path planned by the path planning within a planned time. For example, a target speed and a target angular velocity of the vehicle 1 are calculated.

The operation control unit 63 controls an operation of the vehicle 1 in order to realize the action plan created by the action planning unit 62.

For example, the operation control unit 63 controls a steering control unit 81, a brake control unit 82, and a drive control unit 83 to perform acceleration/deceleration control and direction control such that the vehicle 1 travels on a track calculated by the track planning. For example, the operation control unit 63 performs cooperative control for the purpose of implementing functions of the ADAS, such as collision avoidance or impact mitigation, follow-up traveling, vehicle speed maintaining traveling, collision warning of the own vehicle, lane deviation warning of the own vehicle, and the like. Furthermore, for example, the operation control unit 63 performs cooperative control for the purpose of automatic driving or the like of autonomously traveling without depending on an operation of the driver.

The DMS 30 performs driver authentication processing, recognition processing of a state of the driver, and the like on the basis of sensor data from the in-vehicle sensor 26, input data inputted to the HMI 31, and the like. As the state of the driver to be recognized, for example, a physical condition, an awakening level, a concentration level, a fatigue level, a line-of-sight direction, a drunkenness level, a driving operation, a posture, and the like are assumed.

Note that the DMS 30 may perform authentication processing of a passenger other than the driver and recognition processing of a state of the passenger. Furthermore, for example, the DMS 30 may perform recognition processing of a situation inside the vehicle on the basis of sensor data from the in-vehicle sensor 26. As the situation inside the vehicle to be recognized, for example, a temperature, a humidity, a brightness, odor, and the like are assumed.

The HMI 31 is used for inputting various data, instructions, and the like, generates an input signal on the basis of the inputted data, instructions, and the like, and supplies to each unit of the vehicle control system 11. For example, the HMI 31 includes: operation devices such as a touch panel, a button, a microphone, a switch, and a lever; an operation device that can be inputted by a method other than manual operation, such as with voice or a gesture; and the like. Note that, for example, the HMI 31 may be a remote control device using infrared ray or other radio waves, or external connection equipment such as mobile equipment or wearable equipment corresponding to an operation of the vehicle control system 11.

Furthermore, the HMI 31 performs output control to control generation and output of visual information, auditory information, and tactile information to the passenger or the outside of the vehicle, and to control output contents, output timings, an output method, and the like. The visual information is, for example, information indicated by an image or light such as an operation screen, a state display of the vehicle 1, a warning display, or a monitor image indicating a situation around the vehicle 1. The auditory information is, for example, information indicated by sound such as guidance, warning sound, or a warning message. The tactile information is, for example, information given to a tactile sense of the passenger by a force, a vibration, a movement, or the like.

As a device that outputs visual information, for example, a display device, a projector, a navigation device, an instrument panel, a camera monitoring system (CMS), an electronic mirror, a lamp, and the like are assumed. The display device may be, for example, a device that displays visual information in a passenger's field of view, such as a head-up display, a transmissive display, or a wearable device having an augmented reality (AR) function, in addition to a device having a normal display.

As a device that outputs auditory information, for example, an audio speaker, a headphone, an earphone, or the like is assumed.

As a device that outputs tactile information, for example, a haptic element using haptic technology, or the like, is assumed. The haptic element is provided, for example, on the steering wheel, a seat, or the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including the steering wheel and the like, an electric power steering, and the like. The steering control unit 81 includes, for example, a controlling unit such as an ECU that controls the steering system, an actuator that drives the steering system, and the like.

The brake control unit 82 performs detection, control, and the like of a state of a brake system of the vehicle 1. The brake system includes, for example, a brake mechanism including a brake pedal, an antilock brake system (ABS), and the like. The brake control unit 82 includes, for example, a controlling unit such as an ECU that controls a brake system, an actuator that drives the brake system, and the like.

The drive control unit 83 performs detection, control, and the like of a state of a drive system of the vehicle 1. The drive system includes, for example, an accelerator pedal, a driving force generation device for generation of a driving force such as an internal combustion engine or a driving motor, a driving force transmission mechanism for transmission of the driving force to wheels, and the like. The drive control unit 83 includes, for example, a controlling unit such as an ECU that controls the drive system, an actuator that drives the drive system, and the like.

The body system control unit 84 performs detection, control, and the like of a state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a controlling unit such as an ECU that controls the body system, an actuator that drives the body system, and the like.

The light control unit 85 performs detection, control, and the like of a state of various lights of the vehicle 1. As the lights to be controlled, for example, a headlight, a backlight, a fog light, a turn signal, a brake light, a projection, a display of a bumper, and the like are assumed. The light control unit 85 includes a controlling unit such as an ECU that controls lights, an actuator that drives lights, and the like.

The horn control unit 86 performs detection, control, and the like of state of a car horn of the vehicle 1. The horn control unit 86 includes, for example, a controlling unit such as an ECU that controls the car horn, an actuator that drives the car horn, and the like.

Figure 2:
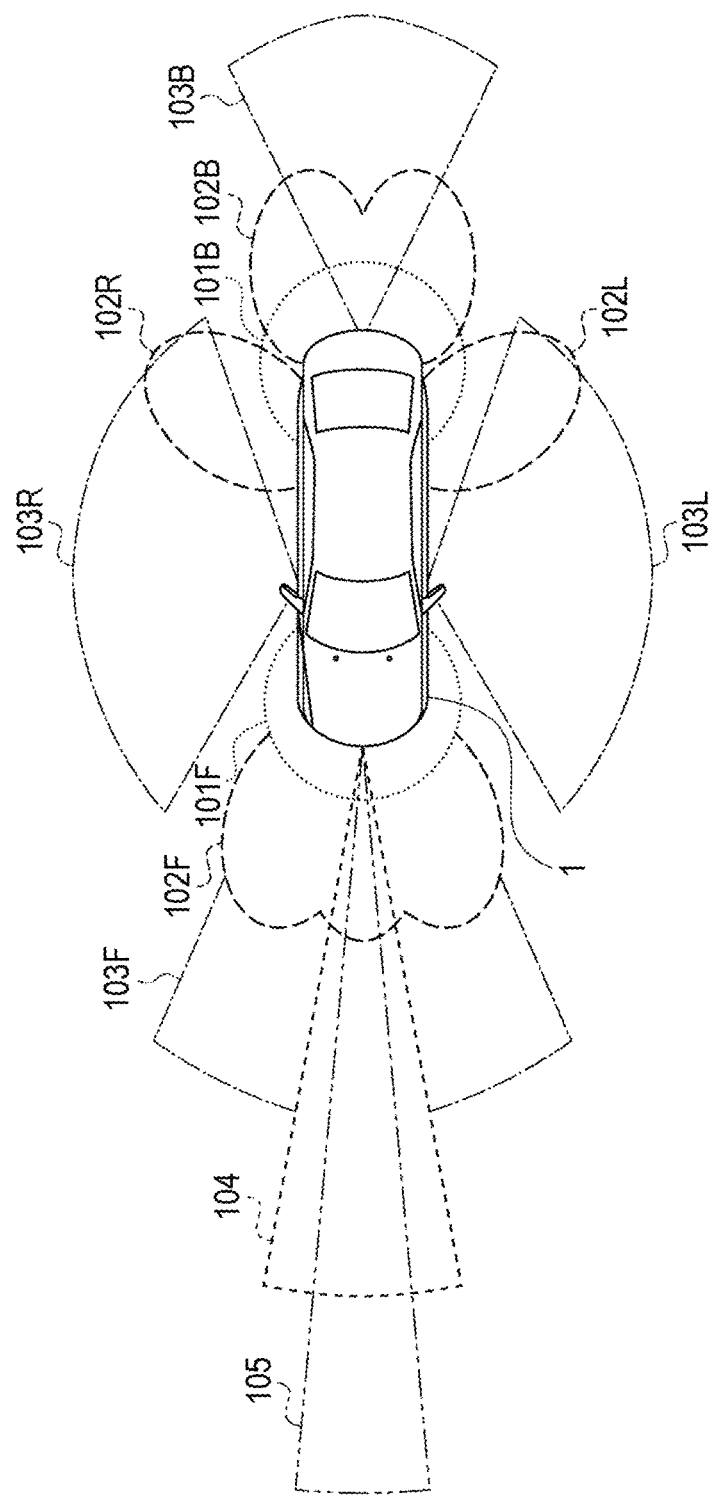
FIG. 2 is a view illustrating an example of a sensing area.

FIG. 2 is a view illustrating an example of a sensing area by the camera 51, the radar 52, the LiDAR 53, and the ultrasonic sensor 54 of the external recognition sensor 25 in FIG. 1.

Sensing areas 101F and 101B illustrate examples of sensing areas of the ultrasonic sensor 54. The sensing area 101F covers a periphery of a front end of the vehicle 1. The sensing area 101B covers a periphery of a rear end of the vehicle 1.

Sensing results in the sensing areas 101F and 101B are used, for example, for parking assistance and the like of the vehicle 1.

Sensing areas 102F to 102B illustrate examples of sensing areas of the radar 52 for a short distance or a middle distance. The sensing area 102F covers a position farther than the sensing area 101F in front of the vehicle 1. The sensing area 102B covers a position farther than the sensing area 101B behind the vehicle 1. The sensing area 102L covers a rear periphery of a left side surface of the vehicle 1. The sensing area 102R covers a rear periphery of a right side surface of the vehicle 1.

A sensing result in the sensing area 102F is used, for example, for detection of a vehicle, a pedestrian, or the like existing in front of the vehicle 1, and the like. A sensing result in the sensing area 102B is used, for example, for a collision prevention function or the like behind the vehicle 1. Sensing results in the sensing areas 102L and 102R are used, for example, for detection of an object in a blind spot on a side of the vehicle 1, and the like.

Sensing areas 103F to 103B illustrate examples of sensing areas by the camera 51. The sensing area 103F covers a position farther than the sensing area 102F in front of the vehicle 1. The sensing area 103B covers a position farther than the sensing area 102B behind the vehicle 1. The sensing area 103L covers a periphery of a left side surface of the vehicle 1. The sensing area 103R covers a periphery of a right side surface of the vehicle 1.

A sensing result in the sensing area 103F is used for, for example, recognition of a traffic light or a traffic sign, a lane departure prevention assist system, and the like. A sensing result in the sensing area 103B is used for, for example, parking assistance, a surround view system, and the like. Sensing results in the sensing areas 103L and 103R are used, for example, in a surround view system or the like.

A sensing area 104 illustrates an example of a sensing area of the LiDAR 53. The sensing area 104 covers a position farther than the sensing area 103F in front of the vehicle 1. Whereas, the sensing area 104 has a narrower range in a left-right direction than the sensing area 103F.

A sensing result in the sensing area 104 is used for, for example, emergency braking, collision avoidance, pedestrian detection, and the like.

A sensing area 105 illustrates an example of a sensing area of the radar 52 for a long distance. The sensing area 105 covers a position farther than the sensing area 104 in front of the vehicle 1. Whereas, the sensing area 105 has a narrower range in a left-right direction than the sensing area 104.

A sensing result in the sensing area 105 is used for, for example, adaptive cruise control (ACC) and the like.

Note that the sensing area of each sensor may have various configurations other than those in FIG. 2. Specifically, the ultrasonic sensor 54 may also perform sensing on a side of the vehicle 1, or the LiDAR 53 may perform sensing behind the vehicle 1.

2. Embodiment

Next, an embodiment of the present technology will be described with reference to FIGS. 3 to 35.

<Configuration Example of Exterior of Vehicle 1>

First, a configuration example of an exterior of the vehicle 1 will be described with reference to FIGS. 3 to 9. Hereinafter, a configuration of an illumination system outside the vehicle 1 will be mainly described.

Figure 3:
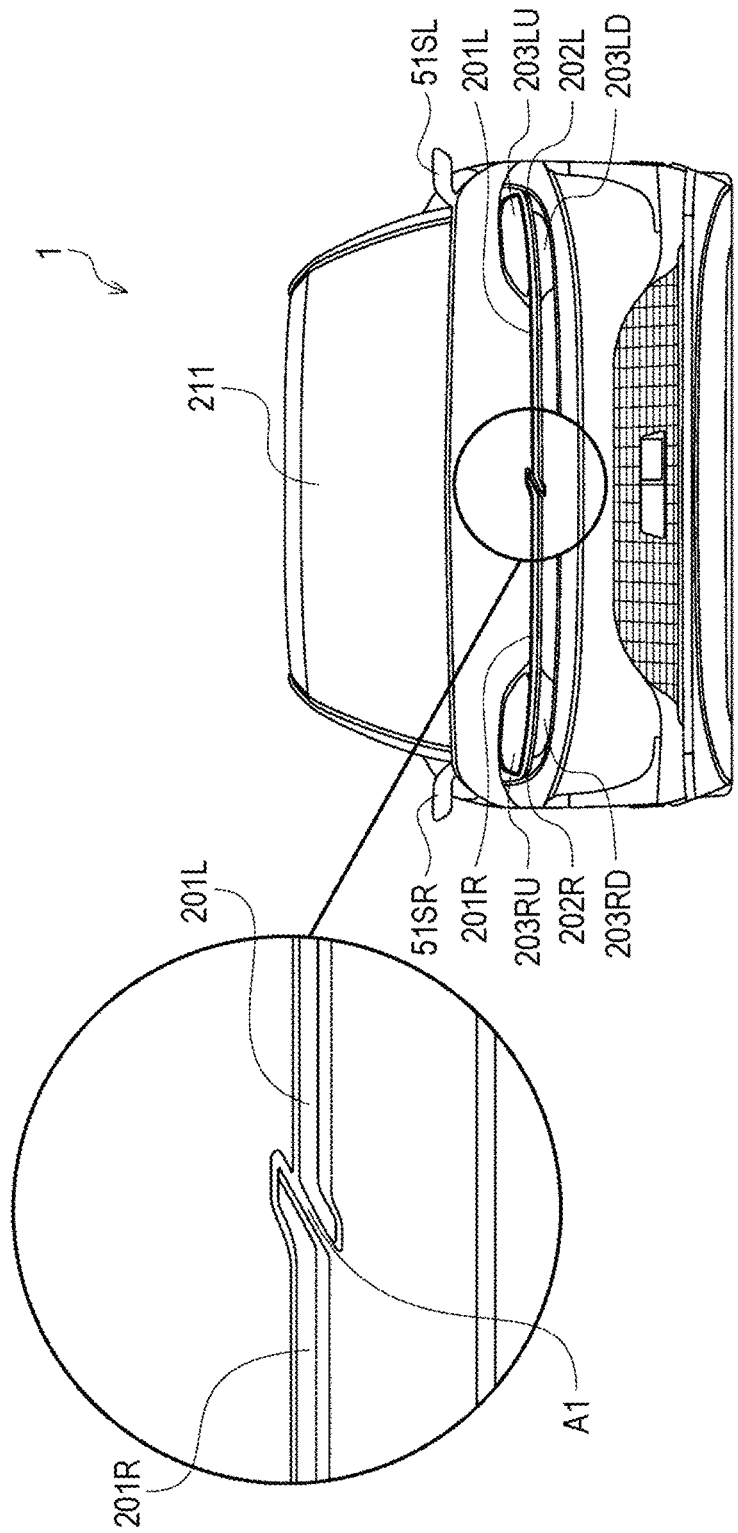
FIG. 3 is a front view of a vehicle and an enlarged view of the vicinity of a logo.
Figure 4:
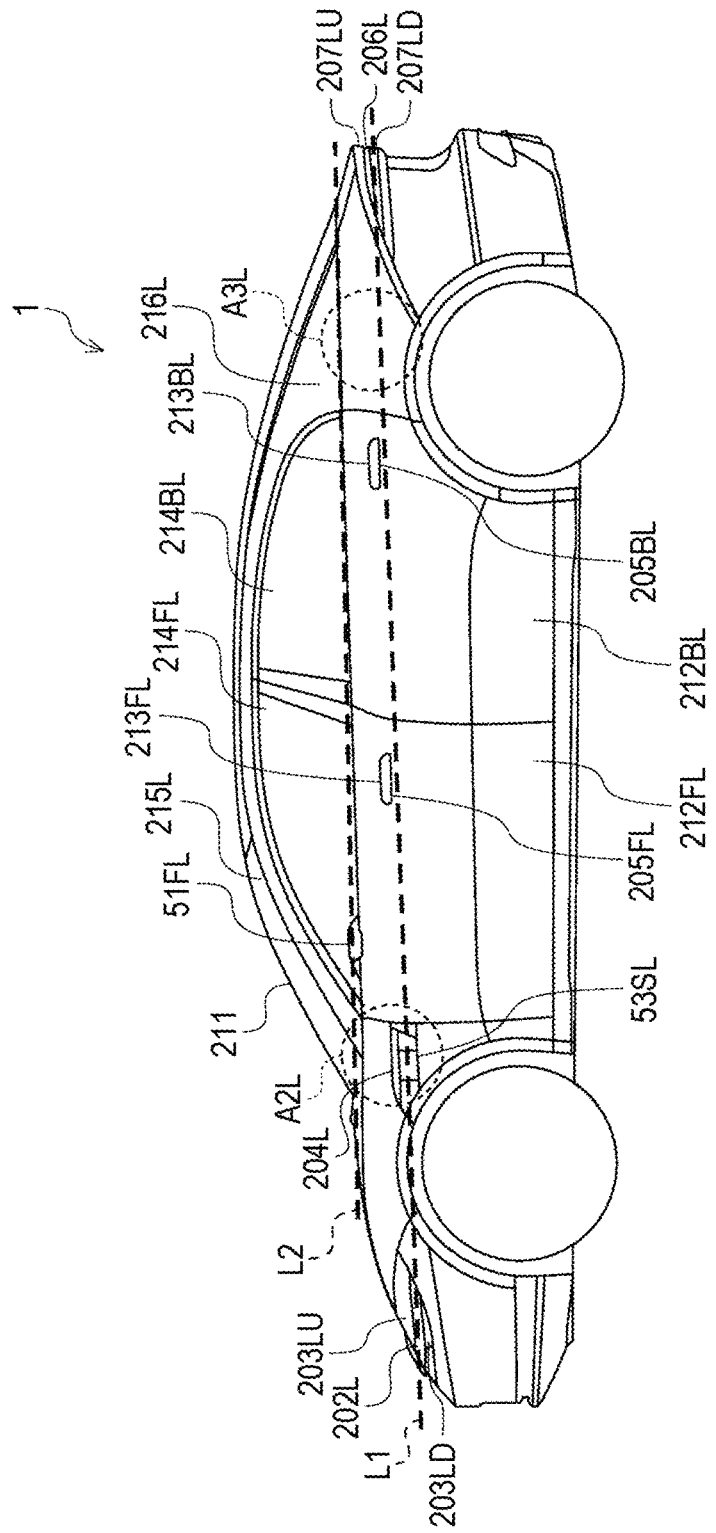
FIG. 4 is a left side view of the vehicle.
Figure 5:
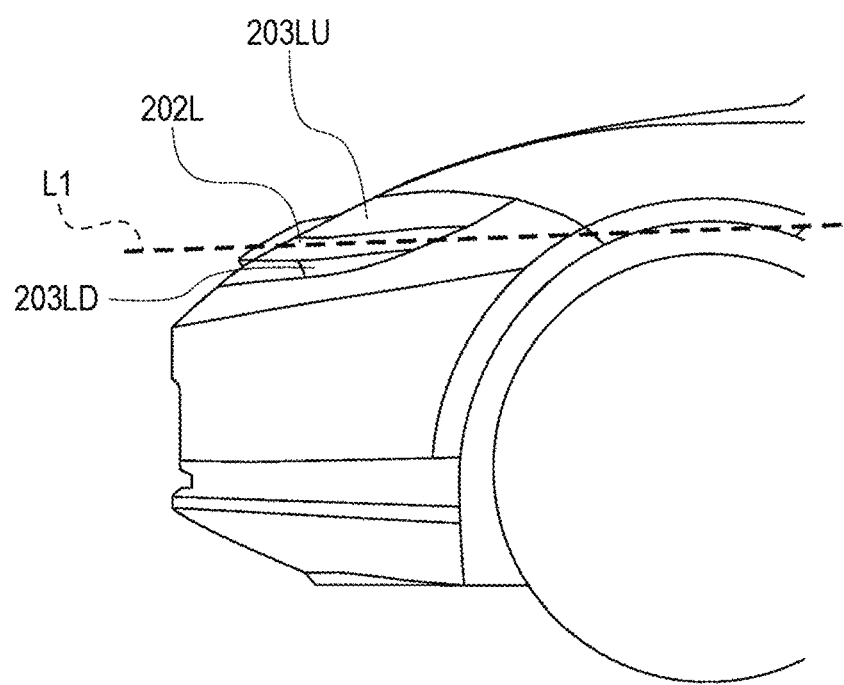
FIG. 5 is an enlarged view of a distal end portion of a left side surface of the vehicle.
Figure 6:
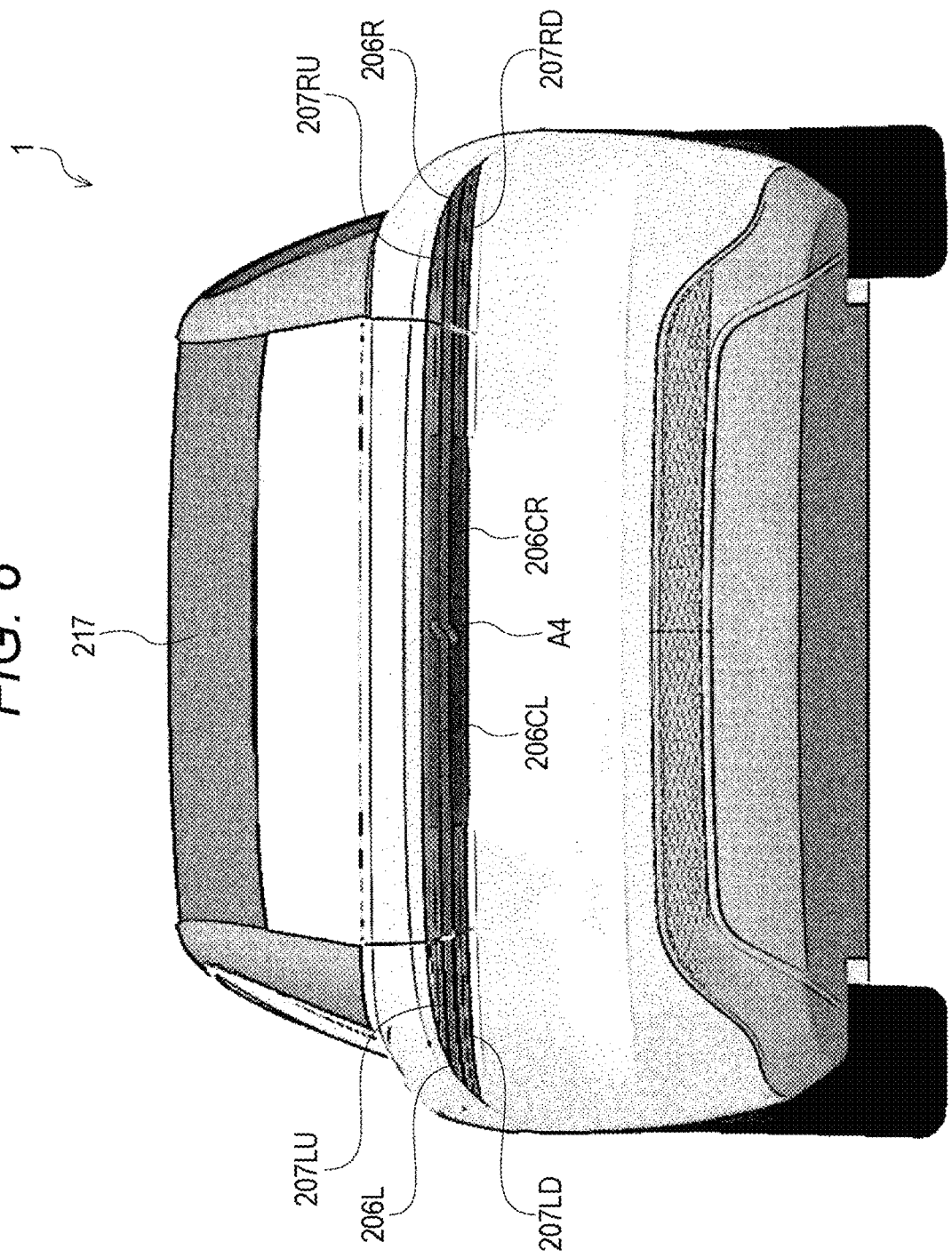
FIG. 6 is a rear view of the vehicle.
Figure 7:
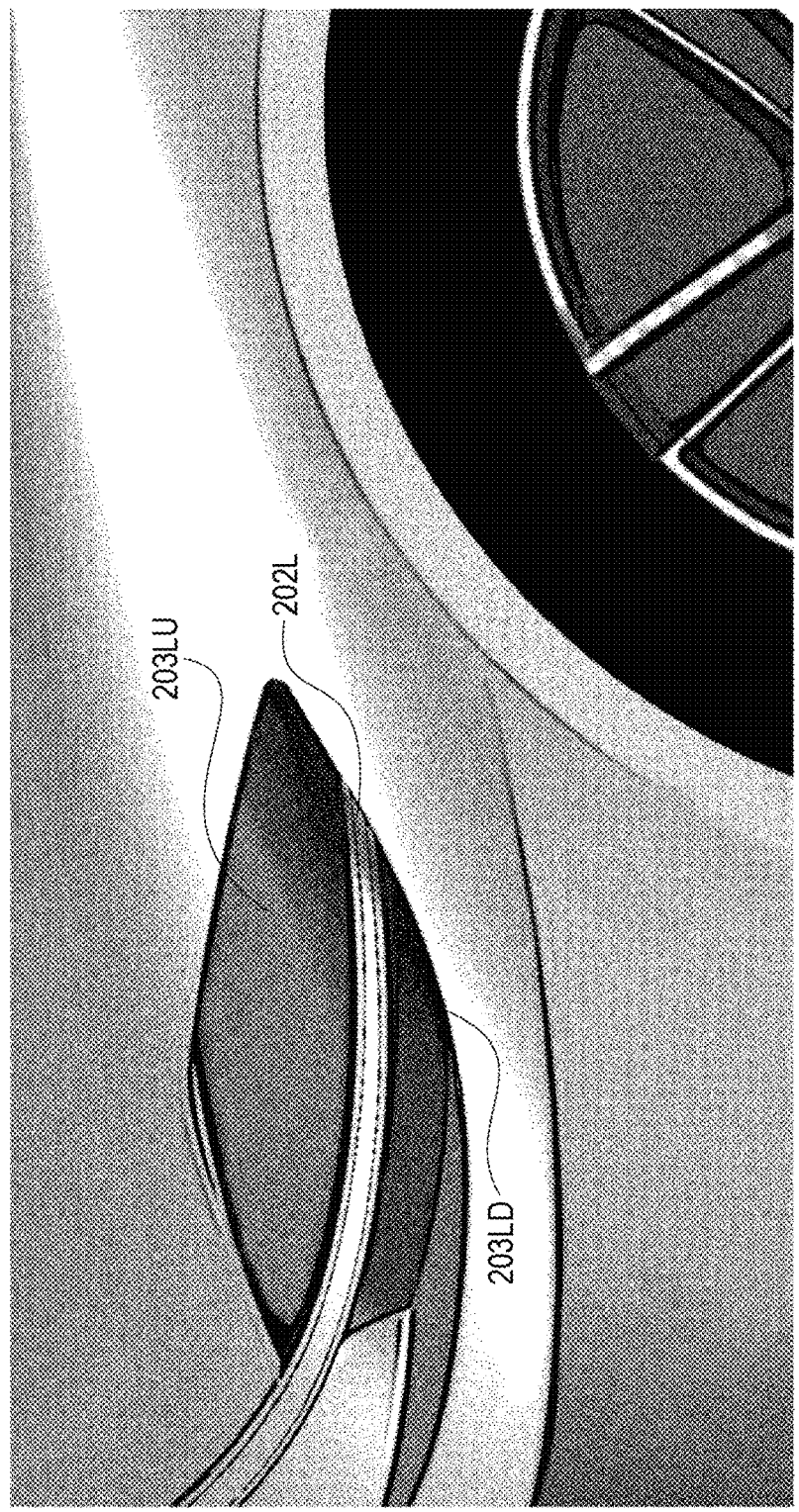
FIG. 7 is a view of the vicinity of a headlight on a left side of the vehicle.
Figure 8:
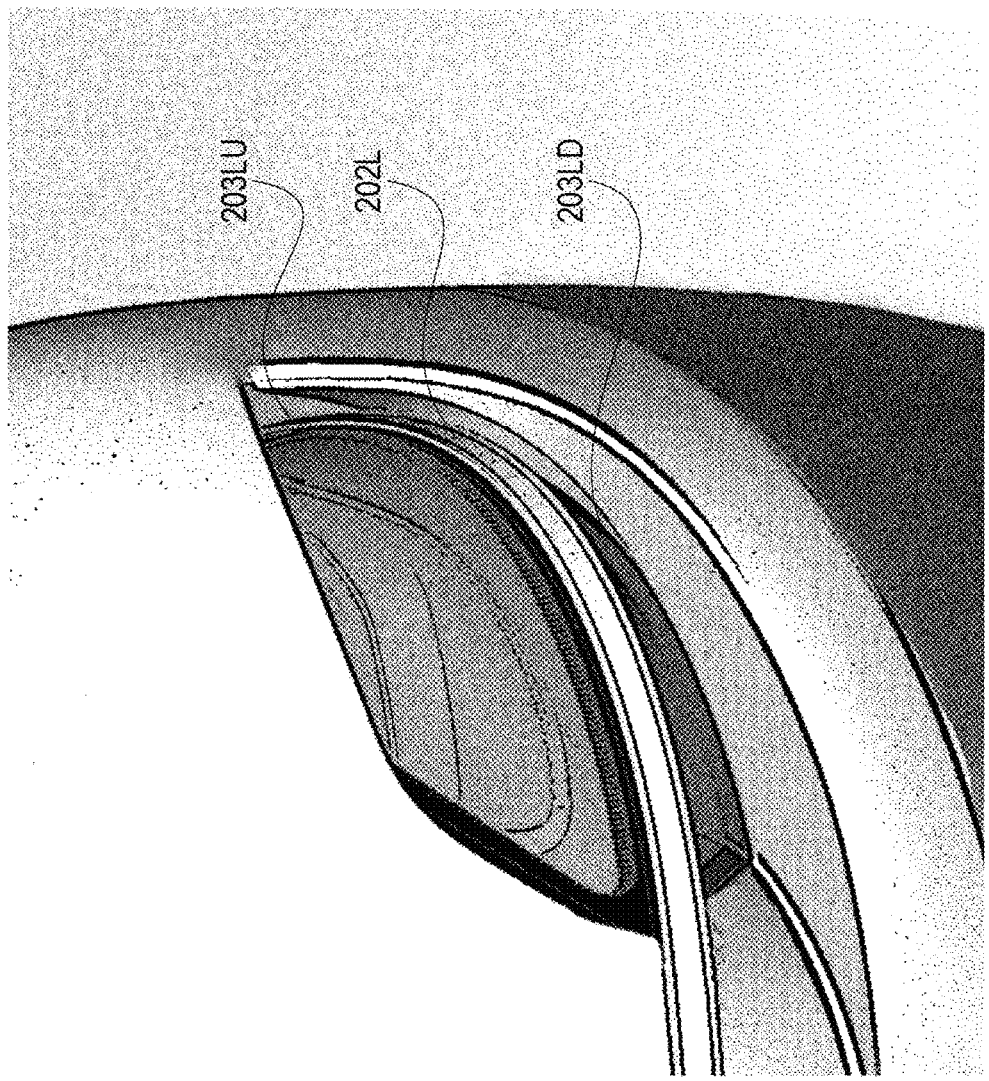
FIG. 8 is a view of the vicinity of the headlight on the left side of the vehicle.
Figure 9:
FIG. 9 is a view of the vicinity of the headlight on the left side of the vehicle.

FIG. 3 is a front view of the vehicle 1 and an enlarged view of the vicinity of a logo of the vehicle 1 at a center of the front. FIG. 4 is a left side view of the vehicle 1. FIG. 5 is an enlarged view of a distal end portion of a left side surface of the vehicle 1. FIG. 6 is a rear view of the vehicle 1. FIGS. 7 to 9 are views of the vicinity of a headlight on a left side of the vehicle 1 as viewed from a plurality of directions.

Note that, hereinafter, a left side and a right side when facing a traveling direction of the vehicle 1 are referred to as a left side and a right side of the vehicle 1, respectively. For example, a left side and a right side in FIG. 3 are the right side and the left side of the vehicle 1, respectively.

Many of lights and sensors outside the vehicle 1 are arranged along a loop line L1, which is a virtual line surrounding a periphery of a body of the vehicle 1 in a substantially horizontal direction. Here, "arranged along the loop line L1" includes not only a case of being arranged on the loop line L1 but also a case of being arranged in the vicinity of the loop line L1.

For example, as illustrated in FIG. 3, an accessory light 201L, an accessory light 201R, a day running light 202L, a day running light 202R, a headlight 203LU, a headlight 203LD, a headlight 203RU, and a headlight 203RD are arranged on a front surface of the body.

The accessory light 201L extends in a vehicle width direction (a left-right direction) from a center of the front surface of the body to the vicinity of the right ends of the headlights 203LU and 203LD. The accessory light 201R extends in the vehicle width direction (the left-right direction) from a center of the front surface of the body to the vicinity of the left ends of the headlights 203RU and 203RD.

The accessory light 201L and the accessory light 201R are divided from each other and provided with a gap. Specifically, a right end portion of the accessory light 201L is bent diagonally downward to the right, and a left end portion of the accessory light 201R is bent diagonally upward to the left. The bent portion at the right end of the accessory light 201L and the bent portion at the left end of the accessory light 201R face each other substantially in parallel at a predetermined interval, to form the logo of the vehicle 1. An optical sensor (not illustrated) such as, for example, a camera, a radar, or a LiDAR is arranged in an area A1 of a gap between the accessory light 201L and the accessory light 201R, near a center of the logo.

The day running light 202L extends in a horizontal direction from the left end of the accessory light 201L to the vicinity of the left ends of the headlights 203LU and 203LD. Furthermore, as illustrated in FIGS. 7 to 9, a left end portion of the day running light 202L is curved rearward of the vehicle 1 and extends in a direction penetrating the body.

The day running light 202R extends in the horizontal direction from the right end of the accessory light 201R to the vicinity of the right ends of the headlights 203RU and 203RD. Furthermore, although not illustrated, similarly to the day running light 202L, a right end portion of the day running light 202R is curved rearward of the vehicle 1 and extends in the direction penetrating the body.

The accessory light 201L, the accessory light 201R, the day running light 202L, and the day running light 202R constitute a front light along the loop line L1 on the front surface of the body. Furthermore, the front light constitutes a front line that is a part of the loop line L1, extends in the vehicle width direction (the left-right direction) on the front surface of the body, is curved rearward at both end portions, and extends in the direction penetrating the body.

Each of the accessory light 201L, the accessory light 201R, the day running light 202L, and the day running light 202R includes a plurality of LEDs arranged in the horizontal direction. For each LED, on/off, color, a brightness, and the like can be individually controlled.

Note that, the accessory light 201L and the accessory light 201R will be simply referred to as an accessory light 201 in a case where it is not necessary to individually distinguish from each other. Hereinafter, the day running light 202L and the day running light 202R are simply referred to as a day running light 202 in a case where it is not necessary to individually distinguish from each other.

The headlight 203LU is adjacent to an upper side of the day running light 202L, extends in the horizontal direction, and is curved rearward at a left end portion. The headlight 203LD is adjacent to a lower side of the day running light 202L, extends in the horizontal direction, and is curved rearward at a left end portion. As described above, the headlight 203LU and the headlight 203LD are divided vertically by the day running light 202L (the front line).

The headlight 203RU is adjacent to an upper side of the day running light 202R, extends in the horizontal direction, and is curved rearward at a right end portion. The headlight 203RD is adjacent to a lower side of the day running light 202R, extends in the horizontal direction, and is curved rearward at a right end portion. As described above, the headlight 203RU and the headlight 203RD are divided vertically by the day running light 202R (the front line).

Each of the headlight 203LU and the headlight 203RU includes a plurality of LEDs arranged in the horizontal direction and a vertical direction, and outputs a low beam. Each of the headlight 203LD and the headlight 203RD includes a plurality of LEDs arranged in the horizontal direction and the vertical direction, and outputs a high beam. For each LED, on/off, color, a brightness, and the like can be individually controlled.

Note that, hereinafter, the headlight 203LU and the headlight 203LD are simply referred to as a headlight 203L in a case where it is not necessary to individually distinguish from each other. Hereinafter, the headlight 203RU and the headlight 203RD are simply referred to as a headlight 203R in a case where it is not necessary to individually distinguish from each other. Hereinafter, the headlight 203L and the headlight 203R are simply referred to as a headlight 203 in a case where it is not necessary to individually distinguish from each other.

By dividing the headlight 203L and the headlight 203R vertically by the front line in this manner, a degree of freedom in design of the headlight 203L and the headlight 203R is improved. For example, the headlight 203L and the headlight 203R can have a design other than a slanted eye shape or a drooping eye shape. Furthermore, since low beams (the headlight 203LU and the headlight 203RU) and high beams (the headlight 203LD and the headlight 203RD)

are arranged at appropriate positions, the functionality of the headlight 203 and the safety of the vehicle 1 are not deteriorated.

Furthermore, for example, as illustrated in FIG. 4, a turn signal 204L, an auxiliary light 205FL, and an auxiliary light 205BL are arranged on the left side surface of the body.

The turn signal 204L extends in a front-rear direction on an extension line of an A pillar 215L and immediately above the loop line L1.

The auxiliary light 205FL is arranged on a back side of a door knob 213FL of a left front door 212FL, and illuminates the vicinity of the door knob 213FL. Since the door knob 213FL is arranged immediately above the loop line L1, the auxiliary light 205FL is also arranged immediately above the loop line L1.

Furthermore, for example, a short-range wireless communication (not illustrated) such as NFC is arranged near the door knob 213FL or the door knob 213FL.

The auxiliary light 205BL is arranged on a back side of a door knob 213BL of the left rear door 212BL, and illuminates the vicinity of the door knob 213BL. Since the door knob 213BL is arranged immediately above the loop line L1, the auxiliary light 205BL is also arranged immediately above the loop line L1.

Furthermore, for example, a short-range wireless communication (not illustrated) such as NFC is arranged near the door knob 213BL or the door knob 213BL.

As described above, on the left side surface of the vehicle 1, the turn signal 204L, the auxiliary light 205FL, and the auxiliary light 205BL are arranged in the front-rear direction along the loop line L1.

Each of the turn signal 204L, the auxiliary light 205FL, and the auxiliary light 205BL includes a plurality of LEDs arranged in the horizontal direction. For each LED, on/off, color, a brightness, and the like can be individually controlled.

Furthermore, as illustrated in FIG. 4, an optical sensor such as, for example, a camera, a radar, or a LiDAR is provided in an area A2L, near an intersection of the loop line L1 and the extension line of the A pillar 215L. For example, a LiDAR 53FL is provided below the turn signal 204L and on the loop line L1.

Moreover, an optical sensor (not illustrated) such as, for example, a camera, a radar, or a LiDAR is provided in an area A3L near an intersection of the loop line L1 and an extension line of a C pillar 216L.

In this manner, by arranging the optical sensor in the vicinity of the loop line L1, it is recognized that the optical sensor constitutes a part of the loop line L1, for example, even if a color of a surface of the optical sensor is different from a color of the body. As a result, the optical sensor naturally blends into an appearance of the body without giving a feeling of strangeness.

Note that, although not illustrated, also on the right side surface of the vehicle 1, a turn signal 204R, an auxiliary light 205FR, an auxiliary light 205BR, a door knob 213FR, a door knob 213BR, a short-range wireless communication device, and an optical sensor are arranged at positions similar to those on the left side surface.

Moreover, for example, as illustrated in FIG. 6, a taillight 206CL, a taillight 206CR, a taillight 206L, a taillight 206R, a brake light 207LU, a brake light 207LD, a brake light 207RU, and a brake light 207RD are arranged on a back surface of the body.

The taillight 206CL extends in the vehicle width direction (the left-right direction) from a center of the back surface of the body to the vicinity of the right ends of the brake lights 207LU and 207LD. The taillight 206CR extends in the horizontal direction from a center of the back surface of the body to the vehicle width direction (near the right ends) of the brake lights 207RU and 207RD.

The taillight 206CL and the taillight 206CR are divided from each other and provided with a gap. Specifically, a right end portion of the taillight 206CL is bent diagonally upward to the right, and a left end portion of the taillight 206CR is bent diagonally downward to the left. The bent portion at the right end of the taillight 206CL and the bent portion at the left end of the taillight 206CR face each other substantially in parallel at a predetermined interval, to form a logo of the vehicle 1. An optical sensor (not illustrated) such as, for example, a camera, a radar, or a LiDAR is arranged in an area A4 of a gap between the taillight 206CL and the taillight 206CR, near a center of the logo.

The taillight 206L extends in the horizontal direction from the left end of the taillight 206CL to the vicinity of the left ends of the brake lights 207LU and 207LD. A left end portion of the taillight 206L is curved forward. The taillight 206R extends in the horizontal direction from the right end of the taillight 206CR to the vicinity of the right ends of the brake lights 207RU and 207RD. A right end portion of the taillight 206R is curved forward.

The taillight 206CL, the taillight 206CR, the taillight 206L, and the taillight 206R constitute a tail line extending in the left-right direction on the back surface of the body and having both end portions curved forward. The tail line constitutes a part of the loop line L1.

Each of the taillight 206CL, the taillight 206CR, the taillight 206L, and the taillight 206R includes a plurality of LEDs arranged in the horizontal direction. For each LED, on/off, color, a brightness, and the like can be individually controlled.

Note that, hereinafter, the taillight 206CL and the taillight 206CR are simply referred to as a taillight 206C in a case where it is not necessary to individually distinguish from each other. Hereinafter, the taillight 206C, the taillight 206L, and the taillight 206R are simply referred to as a taillight 206 in a case where it is not necessary to individually distinguish from each other.

The brake light 207LU is adjacent to an upper side of the taillight 206L and is curved forward at a left end portion. The brake light 207LD is adjacent to a lower side of the taillight 206L and is curved forward at a left end portion. As described above, the brake light 207LU and the brake light 207LD are divided vertically by the taillight 206L.

The brake light 207RU is adjacent to an upper side of the taillight 206R and is curved forward at a right end portion. The brake light 207RD is adjacent to a lower side of the taillight 206R and is curved forward at a right end portion. As described above, the brake light 207RU and the brake light 207RD are divided vertically by the taillight 206R (tail line).

Each of the brake light 207LU, the brake light 207LD, the brake light 207RU, and the brake light 207RD includes a plurality of LEDs arranged in the horizontal direction. For each LED, on/off, color, a brightness, and the like can be individually controlled.

Note that, hereinafter, the brake light 207LU and the brake light 207LD are simply referred to as a brake light 207L, in a case where it is not necessary to individually distinguish from each other. Hereinafter, the brake light 207RU and the brake light 207RD are simply referred to as a brake light 207R in a case where it is not necessary to individually distinguish from each other. Hereinafter, the brake light 207L and the brake light 207R are simply referred to as a brake light 207 in a case where it is not necessary to individually distinguish from each other.

Furthermore, with a loop line L2, which is a virtual line surrounding a periphery of the body of the vehicle 1 in a substantially horizontal direction, as a boundary, a color of the body is different along a lower end of a windshield 211, a lower end of a window 214FL of the door 212FL, a lower end of a window 214BL of the door 212BL, a lower end of a window 214FR (not illustrated) of a door 212FR, and a lower end of a window 214BR (not illustrated) of a door 212BR.

For example, a black line is formed by chromium plating along the loop line L2. Then, portions above the loop line L2 are integrated in a blackish color. For example, black coating is applied to the body above the loop line L2. Furthermore, the windshield 211, the window 214FL, the window 214BL, the window 214FR, the window 214BR, and a rear window 217 are tinted with a blackish color.

Whereas, below the loop line L2, coating of in a color different from that above the loop line L2 is applied to the body. Note that the color of the body below is not particularly limited.

Furthermore, along the loop line L2 in the vicinity of a front end and a lower end of the window 214FL and the window 214FR (not illustrated), a camera 51SL and a camera 51SR are provided. Each of the camera 51SL and the camera 51SR captures an image of the rear on diagonally left or the rear on diagonally right of the vehicle 1.

As described above, it is possible to improve designability while avoiding deterioration in safety and functionality of the vehicle 1.

For example, in an appearance of the vehicle 1, the two substantially parallel loop lines L1 and L2 are to be virtually recognized. As a result, the vehicle body looks low, and a sporty impression can be given.

Furthermore, as described above, a degree of freedom in design of the headlight is improved. Moreover, since each light is arranged at an appropriate position, functionality of each light and safety of the vehicle 1 are not deteriorated.

Furthermore, by the front line (the front light) being curved rearward at both ends and extending in the direction penetrating the body, an impression is given that the front line penetrates the body to be connected to the LiDAR 53FL on the left side surface and the LiDAR 53RL on the right side surface.

Moreover, by arranging the sensors on the periphery of the vehicle 1 along the loop line L1, an impression of watching (monitoring) the surroundings of the vehicle 1 is given, and it is effective to prevent theft and destruction of the vehicle 1.

<Configuration Example of Interior of Vehicle 1>

Next, a configuration example of an interior of the vehicle 1 will be described with reference to FIGS. 10 to 19.

First, devices arranged along a loop line L11 will be described with reference to FIGS. 10 to 13.

Figure 10:
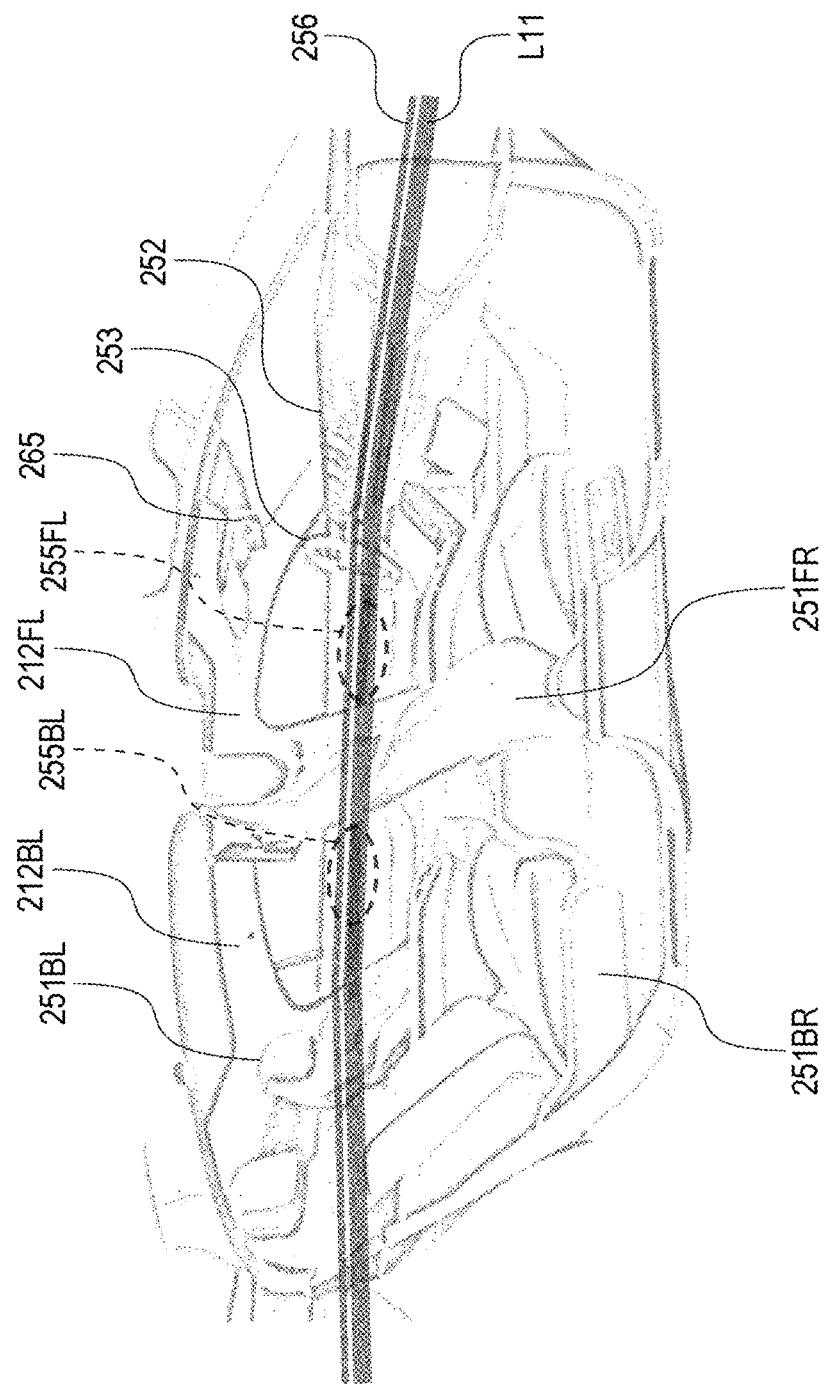
FIG. 10 is a schematic view of an inside of the vehicle as viewed from the right.
Figure 11:
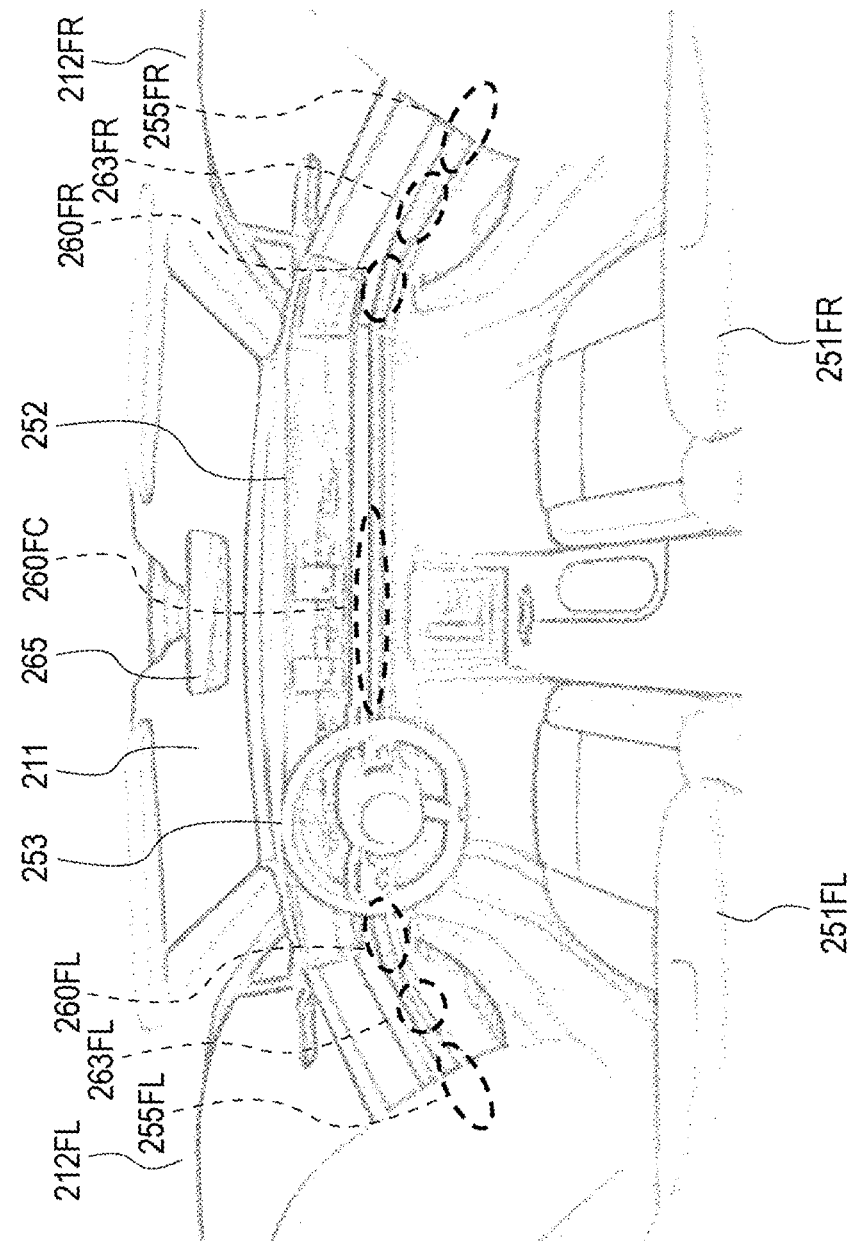
FIG. 11 is a schematic view of the vicinity of a driver seat and a passenger seat of the vehicle.
Figure 12:
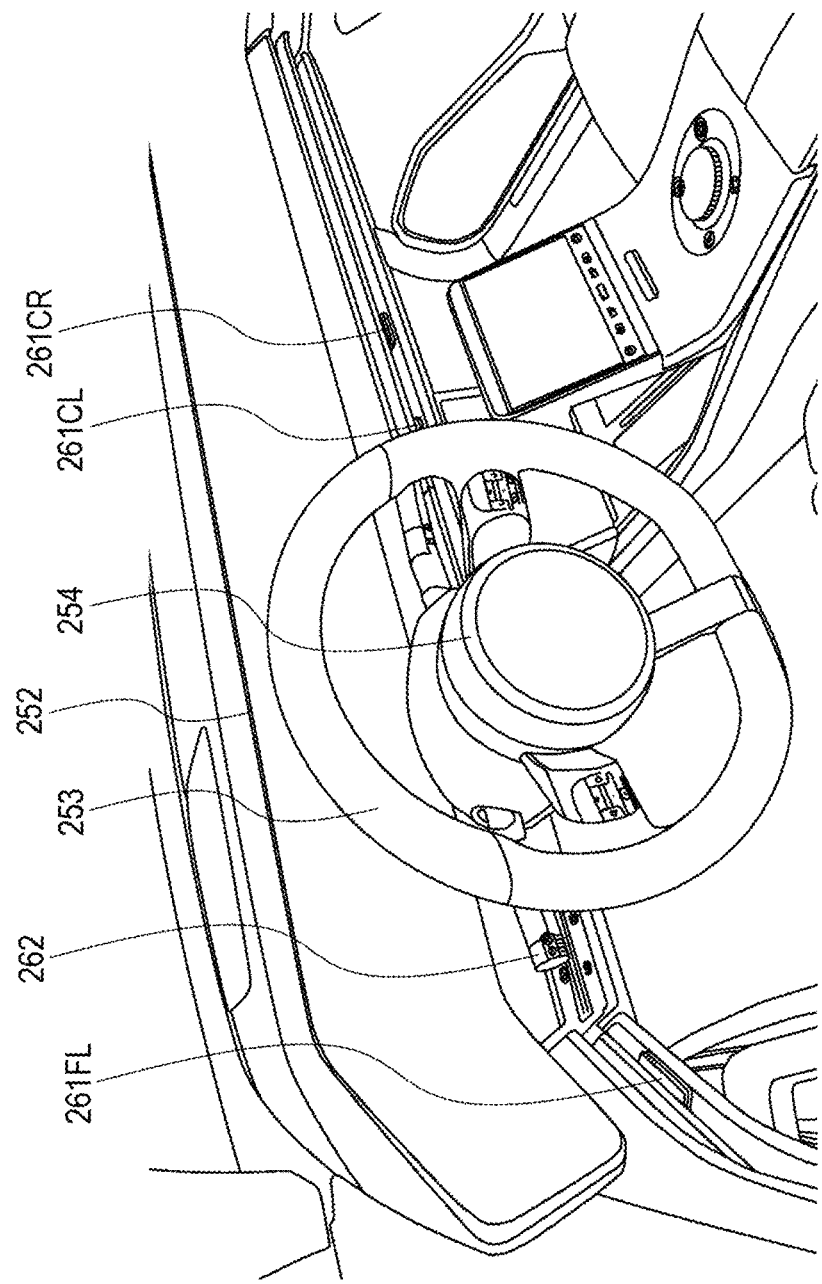
FIG. 12 is a schematic view of the vicinity of a dashboard of the vehicle.
Figure 13:
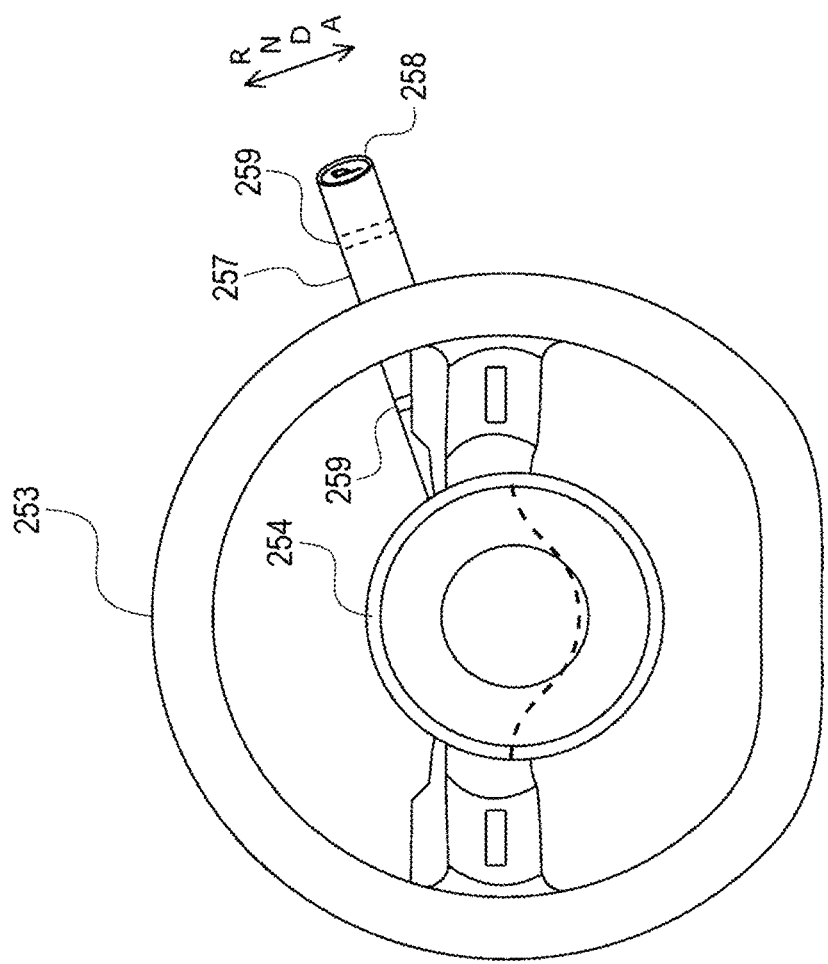
FIG. 13 is an enlarged view of a steering wheel of the vehicle.

FIG. 10 is a schematic view of an inside of the vehicle 1 as viewed from the right. FIG. 11 is a schematic view of the vicinity of a driver seat 251FL and a passenger seat 251FR of the vehicle 1. FIG. 12 is a schematic view of the vicinity of a dashboard of the vehicle 1. FIG. 13 is an enlarged view of a steering wheel 253 of the vehicle.

Inside the vehicle 1, a plurality of devices for user interfaces is arranged concentratedly along the loop line L11 (FIG. 10), which is a virtual line surrounding a periphery of the interior in a substantially horizontal direction, and various interfaces are aggregated.

Here, the devices for the user interfaces include, for example, an output device that outputs visual information, auditory information, and tactile information, and an operation device used for various operations. Furthermore, "arranged along the loop line L11" includes not only a case of being arranged on the loop line L11 but also a case of being arranged in the vicinity of the loop line L11.

The loop line L11 is arranged at the same height as the loop line L1 outside the vehicle 1. Furthermore, the loop line L11 is slightly inclined upward from the front to the rear. This is because positions of a rear seat 251BL and a rear seat 251BR are higher than positions of the driver seat 251FL and the passenger seat 251FR.

For example, a display device constituting the HMI 31 of FIG. 1 is arranged along the loop line L11.

For example, as illustrated in FIGS. 10 to 12, a center display 252 is arranged on a front surface of the dashboard in front of the driver seat 251FL and the passenger seat 251FR so as to extend immediately above the loop line L11 in the vehicle width direction (the left-right direction).

The center display 252 is largely sectioned into a left end portion, a central portion, and a right end portion depending on an orientation of the display. The left end portion, the central portion, and the right end portion of the center display 252 can individually perform display independently, or can perform display integrally. The left end portion and the right end portion of the center display 252 are mainly used as a digital outer mirror (an electronic side mirror), which is an alternative to a conventional side mirror. For example, the left end portion displays an image of the rear on diagonally left of the vehicle 1 captured by the camera 51SL (FIG. 3). The right end portion displays an image of the rear on diagonally right of the vehicle 1 captured by the camera 51SR (FIG. 3).

Furthermore, as illustrated in FIGS. 11 to 13, the steering wheel 253 is arranged on the loop line L11 in front of the driver seat 251FL.

Moreover, as illustrated in FIGS. 12 and 13, an illumination 254 is provided along a periphery of a central portion of the steering wheel 253. The illumination 254 includes a plurality of LEDs arranged on a circumference along a periphery of the central portion of the steering wheel 253. For each LED, on/off, color, a brightness, and the like can be individually controlled. Therefore, a color, a brightness, and a light emitting area (light emitting range) of the illumination 254 are variable.

Note that an airbag is accommodated in the central portion of the steering wheel 253. Then, when the airbag is in operation, a portion indicated by a dotted line in the central portion of the steering wheel 253 in FIG. 13 is broken. The illumination 254 is arranged so as to avoid the portion to be broken in the central portion. As a result, scattering of fragments of the illumination 254 and harmful substances can be prevented during operation of the airbag.

Furthermore, speakers constituting the HMI 31 of FIG. 1 are arranged along the loop line L11.

Specifically, as illustrated in FIGS. 10 and 11, a speaker 255FL is embedded near the loop line L11 inside the door 212FL on the driver seat 251FL side. As illustrated in FIG. 11, a speaker 255FR is embedded near the loop line L11 inside the door 212FR on the passenger seat 251FR side. As illustrated in FIG. 10, a speaker 255BL is embedded near the loop line L11 inside the door 212BL on the left rear seat 251BL side. Although not illustrated, a speaker 255BR is embedded near the loop line L11 inside the door 212BR on the right rear seat 251BR side.

Furthermore, although not illustrated, a speaker (hereinafter, referred to as a seat speaker) is individually embedded below a headrest of each of the driver seat 251FL, the passenger seat 251FR, the rear seat 251BL, and the rear seat 251BR. Moreover, a shape of the seat and a position of the seat speaker are adjusted so that people of various heights (sitting heights) can clearly hear sound of the seat speaker of each seat.

The speakers 255FL to 255BR arranged along the loop line L11 are used, for example, to output sound for the entire inside of the vehicle (all passengers in the vehicle).

Furthermore, 360-degree real audio is realized by the speakers 255FL to 255FR. By realizing the 360-degree real audio, for example, it is possible to enjoy a moving image, music, and the like inside the vehicle with sound with realistic feeling. Furthermore, a position of a dangerous object such as an obstacle existing around the vehicle 1 can be notified by an output direction of the sound.

Whereas, the seat speaker of each seat is mainly used, for example, to output a private sound for an individual passenger sitting on each seat. That is, the sound outputted from each of the seat speakers is individually controlled.

Note that the arrangement of the speakers is an example and can be changed. For example, the number of speakers arranged on the loop line L11 may be increased. For example, a speaker may be arranged on the dashboard in a front part of the vehicle 1.

Furthermore, as illustrated in FIG. 10, a loop light 256 is arranged so as to surround an inner periphery of the vehicle in substantially parallel to the loop line L11 slightly above the loop line L11 and at substantially the same height as the loop line L1 outside. The loop light 256 is a downlight including a plurality of LEDs embedded inside the vehicle so as to be arranged in a substantially horizontal direction, and is mainly used as an auxiliary illumination or an interior decoration. For each LED, on/off, color, a brightness, and the like can be individually controlled.

Note that the loop light 256 does not necessarily surround the entire inner periphery of the vehicle, and may surround a part of the inner periphery of the vehicle without being continuous.

Moreover, various operation devices are arranged along the loop line L11.

For example, as described above, the steering wheel 253 is arranged on the loop line L11 in front of the driver seat 251FL.

Furthermore, as illustrated in FIG. 13, a stalk lever 257, which is a rod-shaped operation body, is provided to extend in the vehicle width direction (a lateral direction (a right direction)) from a steering column (not illustrated), behind the steering wheel 253. The stalk lever 257 can be moved in a vertical direction, and a shift position of the vehicle 1 is switched by moving the stalk lever 257 in the vertical direction. That is, the stalk lever 257 constitutes a tilt-type shift lever that is movable in the vertical direction. Note that the stalk lever 257 may be, for example, either a straight type that moves straight in the vertical direction or a column type that moves zigzag in the vertical direction.

A setting order of the shift position by the stalk lever 257 is arranged in the order of reverse (R), neutral (N), drive (D), and automatic driving (A) from the top. That is, when the stalk lever 257 is moved in a downward direction from the top, the shift position is switched in the order of R, N, D, and A. When the stalk lever 257 is moved in an upward direction from the bottom, the shift position is switched in the order of A, D, N, and R.

Furthermore, at a distal end of the stalk lever 257, a button 258 that can be pressed in an axial direction of the stalk lever 257 is provided. When the button 258 is pressed, the shift position of the vehicle 1 is switched to parking (P).

Furthermore, an indicator 259 is provided circumferentially on a side surface of the stalk lever 257 in a circumferential direction. The indicator 259 is arranged at a position visible from a gap between spokes of the steering wheel 253 when viewed from the driver seat 251FL.

A color of the indicator 259 changes depending on the set shift position. For example, in a case where the shift position is set to parking, the indicator 259 is red. In a case where the shift position is set to drive, the indicator 259 is white. In a case where the shift position is set to automatic driving and automatic driving is possible, the indicator 259 is green. In a case where the shift position is set to automatic driving and automatic driving is in operation, the indicator 259 is blue.

Note that, as indicated by a dotted line in FIG. 13, the indicator 259 may be arranged outside an outer periphery of the steering wheel 253 when viewed from the driver seat 251FL. As a result, the indicator 259 becomes visible from outside the steering wheel 253. Furthermore, the indicator 259 may be arranged at both positions of a solid line and the dotted line.

In this way, by providing the indicator 259 on the operation body (the stalk lever 257) used for switching the shift position, the driver can intuitively understand the meaning represented by the color of the indicator 259 and intuitively and reliably recognize the shift position.

Furthermore, for example, a setting state of the shift position may be displayed on the center display 252 or the like. In this case, for example, the shift position is displayed in the order of the setting direction by the stalk lever 257. That is, the shift position is displayed in the order of reverse (R), neutral (N), drive (D), and automatic driving (A) from the top.

Moreover, for example, a dial that rotates around an axis (a circumferential direction) may be provided at a distal end or in the middle in the axial direction of the stalk lever 257, and the shift position may be switched by rotating the dial.

Furthermore, as illustrated in FIG. 11, a blowing port 260FC, a blowing port 260FL, and a blowing port 260FR of an air conditioner (A/C) are arranged on the loop line L11. Specifically, the blowing port 260FR is arranged immediately below the center display 252 between the driver seat 251FL and the passenger seat 251FR. The blowing port 260FL is arranged immediately below the center display 252 near a joint part of the door 212FL on the driver seat 251FL side. The blowing port 260FR is arranged immediately below the center display 252, near a joint part of the door 212FR on the passenger seat 251FR side.

Moreover, as illustrated in FIG. 12, the blowing port 260FC is provided with a knob 261CL and a knob 261CR for change of a wind direction. As illustrated in FIG. 12, the blowing port 260FL is provided with a knob 261FL for change of a wind direction. Although not illustrated, the blowing port 260FR is provided with a knob 261FR for change of a wind direction, at a position similar to that of the knob 261FL of the blowing port 260FL. In this manner, the knob 261CL, the knob 261CR, the knob 261FL, and the knob 261FR are provided on the loop line L11.

Furthermore, as illustrated in FIG. 12, an operation unit 262 including a switch or the like to perform various settings of the headlight 203 is arranged on the loop line L11 on a right side behind the steering wheel 253.

Moreover, a door opener is arranged on the loop line L11. For example, as illustrated in FIG. 11, a door opener 263FL is arranged on the loop line L11 near a center of the door 212FL on the driver seat 251FL side in the front-rear direction. Similarly, a door opener 263FR is arranged on the loop line L11 near the center of the door 212FR on the passenger seat 251FR side in the front-rear direction.

As described above, by arranging devices or the like for various user interfaces along the loop line L11, noise that hinders driving is removed from a line-of-sight of the driver, and an environment to facilitate concentration on driving is provided. Furthermore, by aggregating various devices in the vicinity of the loop line L11, it is possible to intuitively recognize the positions of various devices and operate. Moreover, since various devices are aggregated in the vicinity of the loop line L11 and the loop light 256 is arranged, an impression of watching the inside of the vehicle 1 is given. Furthermore, a movement of a line-of-sight of a passenger such as the driver in the vertical direction is reduced, and the carsickness of the passenger is suppressed.

Figure 14:
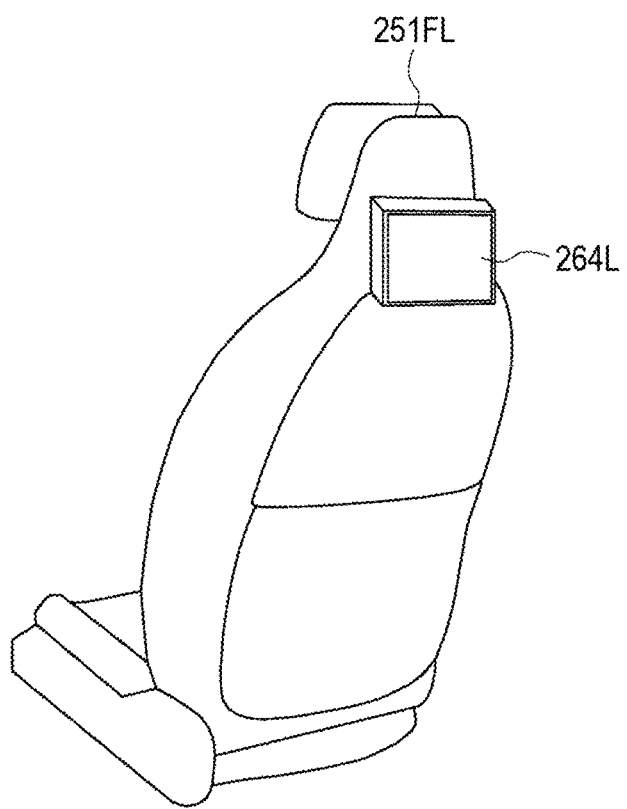
FIG. 14 is a view of the driver seat as viewed from the rear on diagonally left.

FIG. 14 is a view of the driver seat 251FL as viewed from the rear on diagonally left.

A tablet terminal 264L is provided on a back surface of the driver seat 251FL, more specifically, on a back surface of the headrest of the driver seat 251FL.

For example, the tablet terminal 264L presents infotainment-related information to the passenger on the rear seat 251BL, and accepts an operation on the presented information. Furthermore, for example, the tablet terminal 264L displays an alert at a time of emergency, danger, or the like.

Note that, although not illustrated, for example, a tablet terminal 264R similar to the tablet terminal 264L is provided on a back surface of the passenger seat 251FR.

Furthermore, for example, ToF cameras may be individually provided near the tablet terminal 264L and the tablet terminal 264R. As a result, it becomes possible to perform recognition or the like of, for example, the passenger who is operating the tablet terminal 264L and the tablet terminal 264R on the basis of an image captured by the ToF camera.

Next, an example of an installation position of the ToF camera for image capturing in a direction of the driver seat 251FL (the driver sitting on the driver seat 251FL) will be described with reference to FIGS. 15 to 19.

Figure 15:
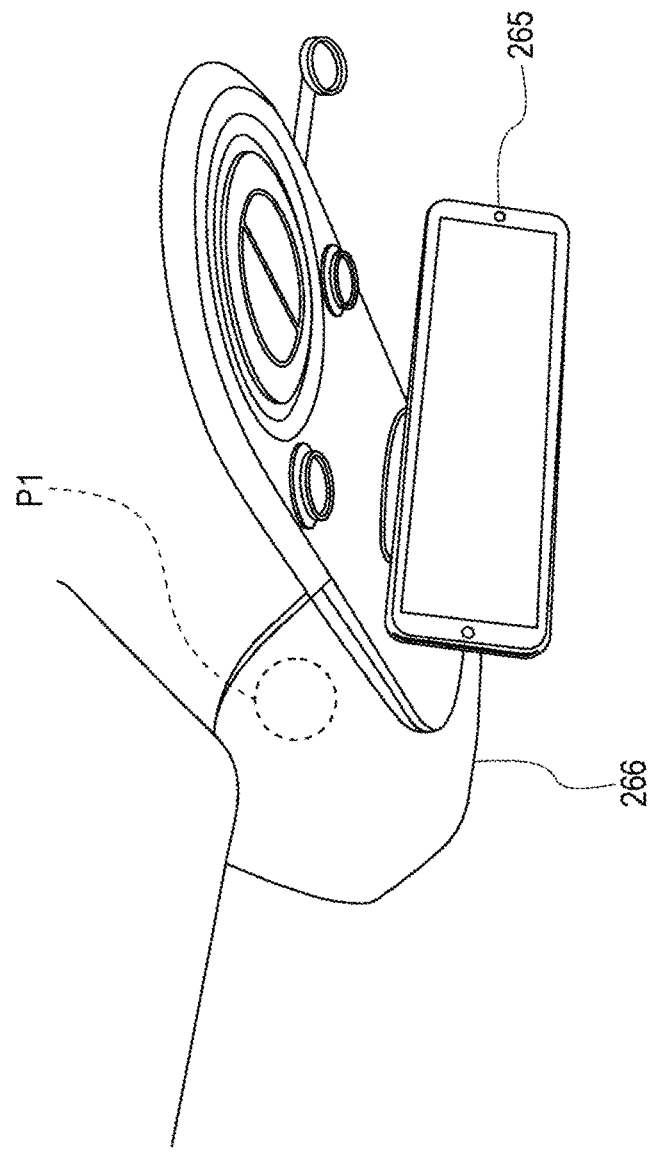
FIG. 15 is a view illustrating an example of an installation position of a ToF camera for image capturing of a driver.
Figure 16:
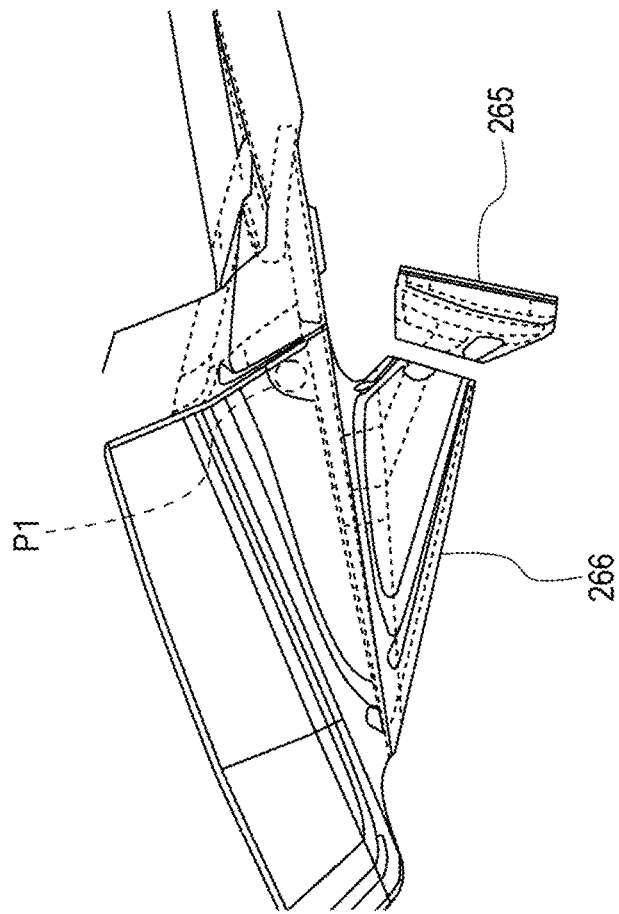
FIG. 16 is a view illustrating an example of the installation position of the ToF camera for image capturing of the driver.

As illustrated in FIGS. 15 and 16, the ToF camera is installed, for example, at an installation position P1 around a digital room mirror 265.

The digital room mirror 265 is used to check the rear of the vehicle 1 instead of a conventional rearview mirror, and is also referred to as a smart room mirror or a digital rear mirror. As illustrated in FIG. 11 and the like, similarly to a conventional rearview mirror, the digital room mirror 265 is provided on a slightly rear side of the vehicle 1 from the windshield 211 near an upper end and a center of the windshield 211, and is arranged above a central portion of the center display 252. Furthermore, as illustrated in FIGS. 15 and 16, the digital room mirror 265 is installed diagonally right in front of the driver seat 251FL, near a ceiling via an attachment part 266.

The installation position P1 is arranged on the ceiling of the vehicle 1 near a rear end of a left side surface of the attachment part 266 and near the upper left of the digital room mirror 265.

Figure 17:
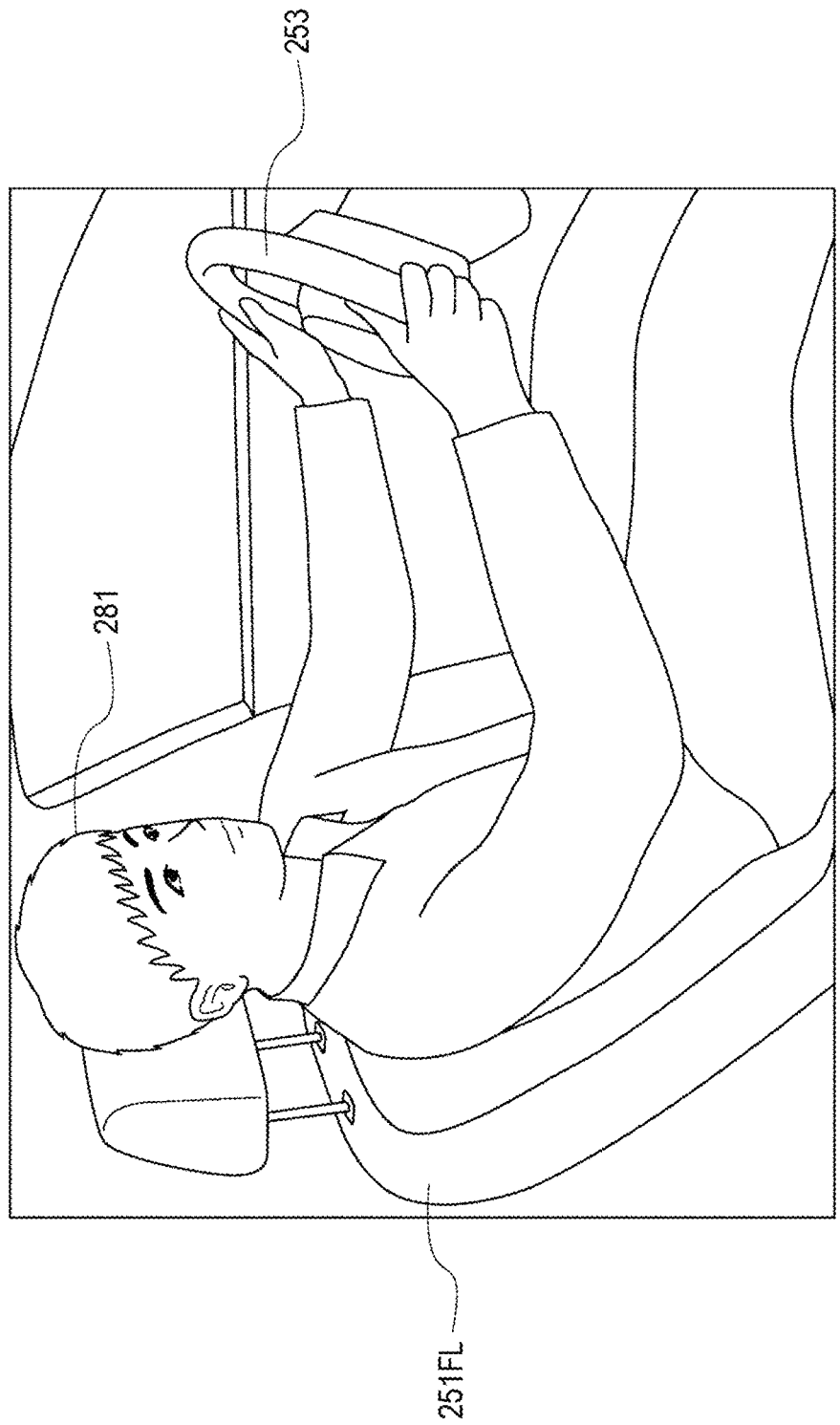
FIG. 17 is a schematic view illustrating an example of an image captured by the ToF camera installed at the installation positions in FIGS. 15 and 16.

FIG. 17 schematically illustrates an example of an image captured by the ToF camera in a case where the ToF camera is installed at the installation position P1.

By installing the ToF camera at the installation position P1, an image of the upper body of a driver 281 sitting on the driver seat 251FL is captured as if being looked down from diagonally right front and above. As a result, an image of the face of the driver 281 can be captured from diagonally right front and above, and for example, the recognition unit 73 (FIG. 1) can recognize the line-of-sight of the driver 281. Furthermore, an image of the upper body of the driver 281 including the steering wheel 253 can be captured in overhead view, and for example, a posture of the driver 281 can be recognized in the recognition unit 73. Moreover, since a probability that an obstacle will appear between the driver 281 and the digital room mirror 265 is low, it is possible to stably recognize the line-of-sight and the posture of the driver 281.

Figure 18:
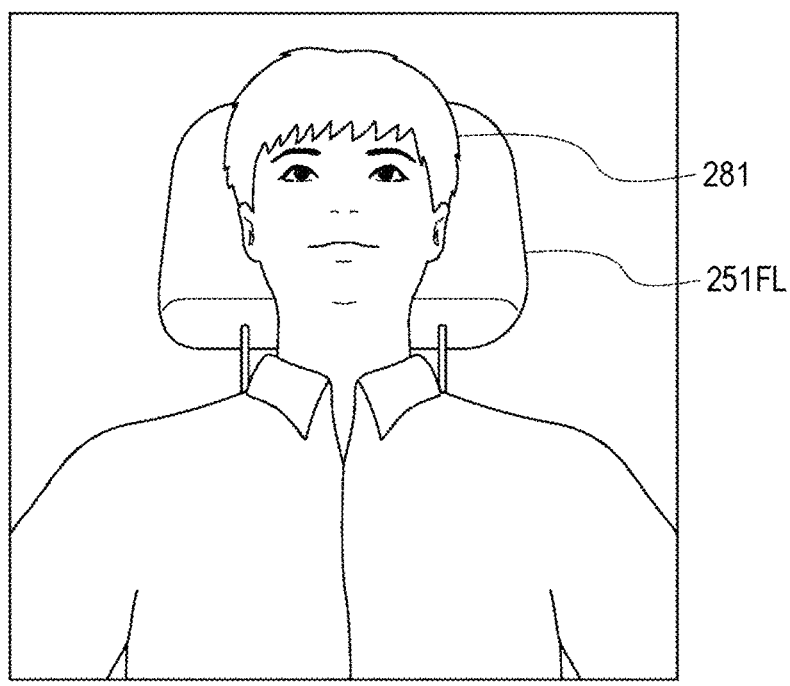
FIG. 18 is a schematic view illustrating an example of an image captured by a ToF camera installed near the steering wheel.

Whereas, FIG. 18 illustrates an example of an image captured by the ToF camera in a case where the ToF camera is arranged at the steering wheel 253 or near the steering wheel 253.

In this case, an image of the vicinity of the face of the driver 281 is captured as if being looked up from the front. Therefore, the recognition unit 73 can recognize the line-of-sight of the driver 281. However, it is assumed that an obstacle such as a hand of the driver 281 easily appears between the driver 281 and the steering wheel 253, and a situation in which the line-of-sight cannot be recognized easily occurs. Furthermore, since an image of the entire upper body of the driver 281 is not captured, it is difficult for the recognition unit 73 to recognize a posture of the driver 281.

Figure 19:
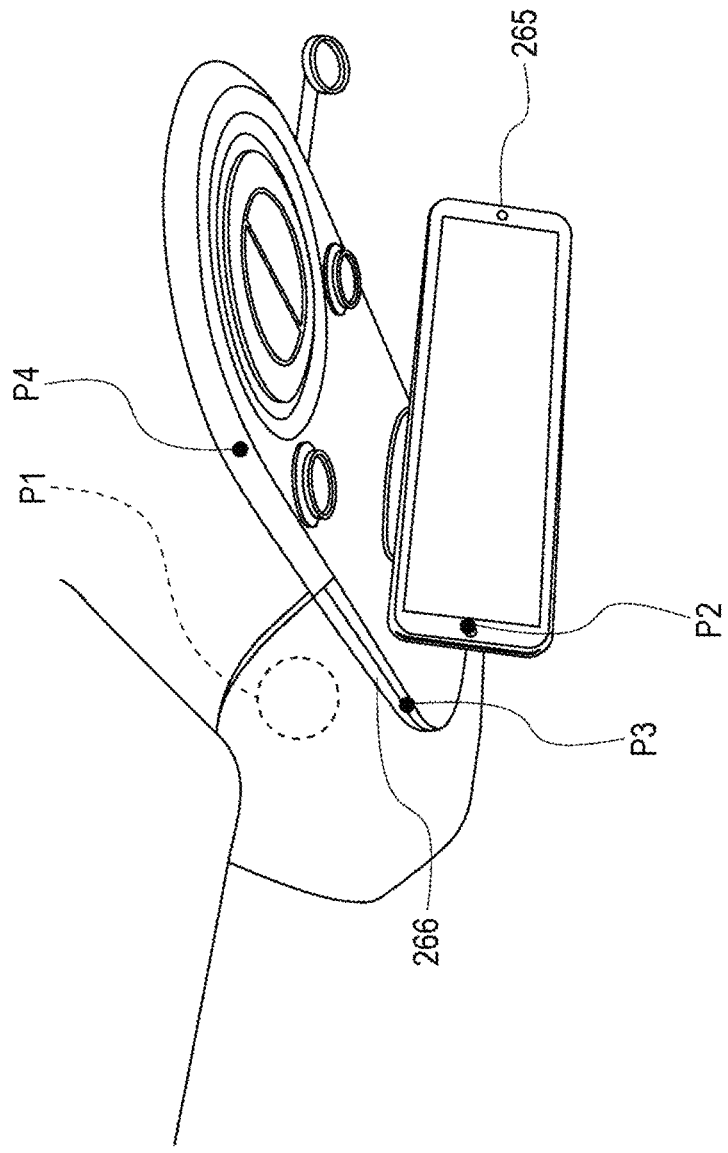
FIG. 19 is a view illustrating an example of an installation position of the ToF camera for image capturing of the driver.

FIG. 19 illustrates a modified example of an installation position of the ToF camera.

For example, the ToF camera may be installed at an installation position P2 at the left end of the digital room mirror 265.

For example, on the ceiling of the vehicle 1, the ToF camera may be installed at an installation position P3 behind the digital room mirror 265 (in a front part of the vehicle 1 with respect to the digital room mirror 265) and closer to the driver seat 251FL with respect to the digital room mirror 265 (to the left with respect to the digital room mirror 265).

For example, on the ceiling of the vehicle 1, the ToF camera may be installed at an installation position P4 in front of the digital room mirror 265 (in a rear part of the vehicle 1 with respect to the digital room mirror 265) and closer to the driver seat 251FL with respect to the digital room mirror 265 (to the left with respect to the digital room mirror 265).

Even if the ToF camera is installed at any of the installation positions P2 to P4, it is possible to recognize a line-of-sight and a posture of the driver on the basis of an image captured by the ToF camera, similarly to the case where the ToF camera is installed at the installation position P1.

Note that, instead of the digital room mirror 265, a conventional optical mirror may be used. Furthermore, a camera of a system different from the ToF camera may be used.

Moreover, for example, a ToF camera that captures an image of the passenger sitting on the passenger seat 251FR may be installed at a position to be right and left target with respect to a camera that captures an image of the driver.

<Configuration Example of Information Processing Unit 351>

Figure 20:
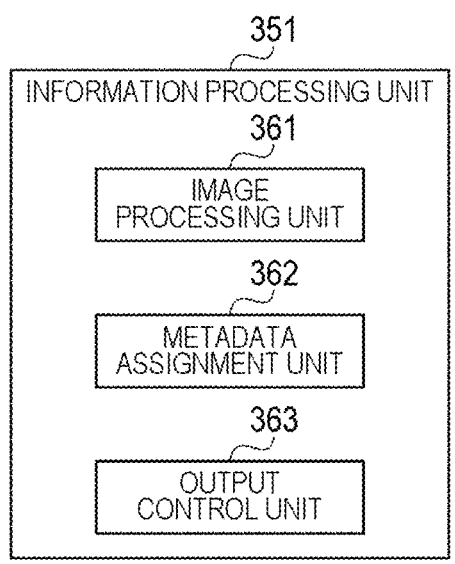
FIG. 20 is a block diagram illustrating a configuration example of an information processing unit.

FIG. 20 is a block diagram illustrating a configuration example of an information processing unit 351 implemented by the processor 21, the HMI 31, and the like in FIG. 1.

The information processing unit 351 includes an image processing unit 361, a metadata assignment unit 362, and an output control unit 363.

The image processing unit 361 performs various types of image processing and editing on moving image data obtained by the camera 51. Furthermore, the image processing unit 361 images sensor data obtained by optical sensors other than cameras, such as the radar 52 and the LiDAR 53.

The metadata assignment unit 362 assigns metadata to moving image data obtained by the camera 51.

The output control unit 363 performs output control of visual information, auditory information, and tactile information in the HMI 31. For example, the output control unit 363 controls output of visual information from the center display 252, the tablet terminal 264L, the tablet terminal 264R, and the illumination 254 of the steering wheel 253. For example, the output control unit 363 controls outputs of auditory information (sound) from the speakers 255FL to 255BR and the seat speaker.

<Operation of Vehicle 1>

Next, an example of an operation of the vehicle 1 will be described with reference to FIGS. 21 to 36.

Note that, hereinafter, the door 212FL, the door 212FR, the door 212BL, and the door 212BR are simply referred to as a door 212, in a case where it is not necessary to individually distinguish from each other.

<Light Emission Pattern of Illumination System>

First, an example of a light emission pattern of an illumination system of the vehicle 1 will be described with reference to FIGS. 21 to 30.

The light control unit 85 (FIG. 1) performs cooperative control of lights outside the vehicle and lights inside the vehicle.

Specifically, FIGS. 21 to 30 illustrate examples of a light emission pattern of the accessory light 201L, the accessory light 201R, the day running light 202L, the day running light 202R, the headlight 203L, the headlight 203R, the turn signal 204L, the turn signal 204R, the auxiliary light 205FL, the auxiliary light 205FR, the auxiliary light 205BL, the auxiliary light 205BR, the taillight 206L, the taillight 206R, the taillight 206CL, the taillight 206CR, the brake light 207L, the brake light 207R, the loop light 256, and a main light 401.

Note that the main light 401 includes LEDs arranged substantially along an outer periphery of the ceiling in the interior of the vehicle 1, and is used as a main illumination inside the vehicle. For each LED, on/off, color, a brightness, and the like can be individually controlled.

Furthermore, FIGS. 21 to 30 integrally illustrate the headlight 203LU and the headlight 203LD, the headlight 203RU and the headlight 203RD, the brake light 207LU and the brake light 207LD, and the brake light 207RU and the brake light 207RD without being distinguished from each other.

Note that, hereinafter, unless otherwise specified, the accessory light 201L, it is assumed that the accessory light 201R, the day running light 202L, the day running light 202R, the headlight 203L, the headlight 203R, the turn signal 204L, the turn signal 204R, the auxiliary light 205FL, the auxiliary light 205FR, the auxiliary light 205BL, and the auxiliary light 205BR emit white light. Hereinafter, unless otherwise specified, it is assumed that the taillight 206L, the taillight 206R, the taillight 206CL, the taillight 206CR, the brake light 207L, and the brake light 207R emit red light. Hereinafter, unless otherwise specified, it is assumed that the loop light 256 and the main light 401 emit orange light.

Furthermore, hereinafter, basically, in each figure, it is assumed that a light turned on is filled in black and a light turned off is filled in white.

<At Time of Power-On>

Figure 21:
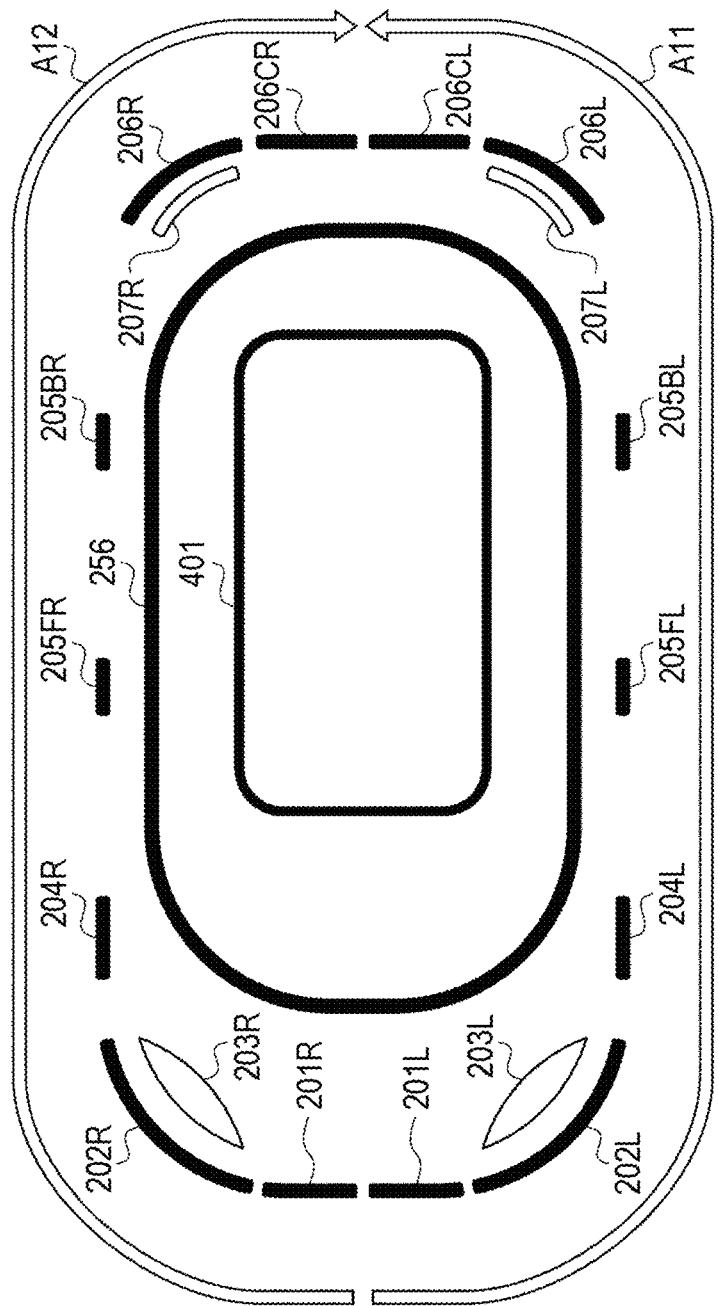
Figure 22:
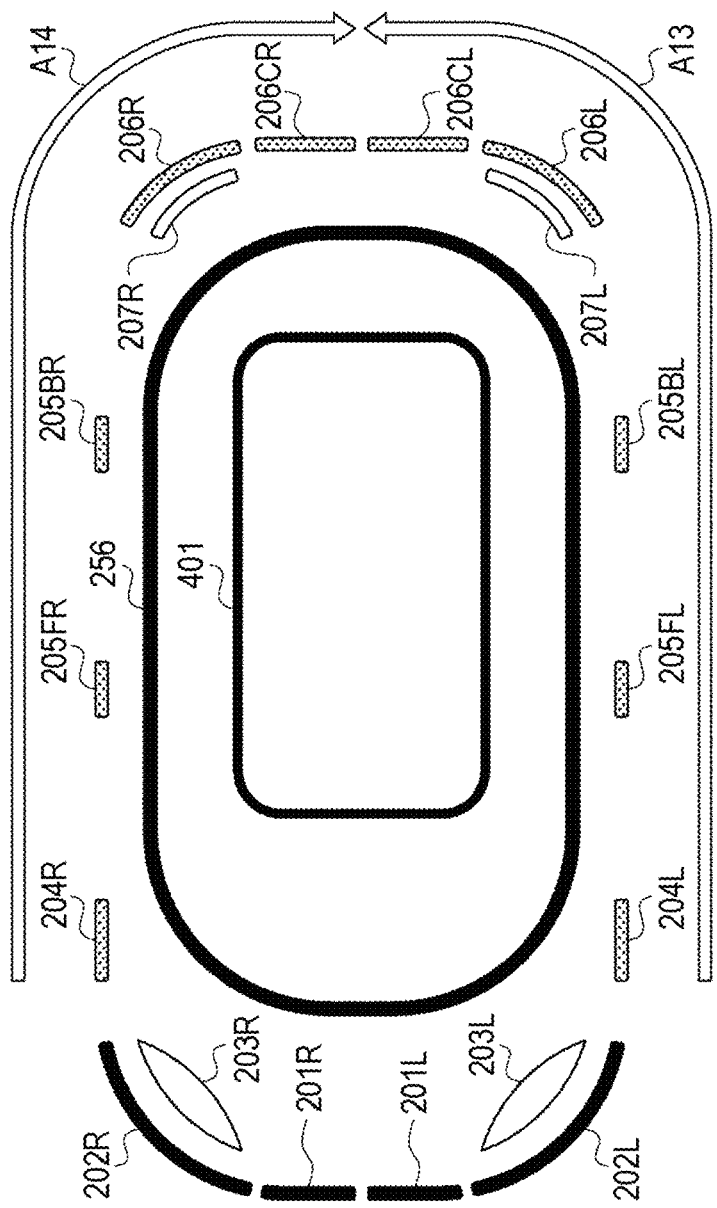

FIGS. 21 and 22 illustrate examples of a light emission pattern when power of the vehicle 1 is turned on. FIG. 21 illustrates a state when all lights to be turned on at the time of power-on are turned on. FIG. 22 illustrates a final light state at the time of power-on.

When the power of the vehicle 1 is turned off, all lights are turned off.

Then, when the power of the vehicle 1 is turned on, the accessory light 201L, the accessory light 201R, the day running light 202L, the day running light 202R, the turn signal 204L, the turn signal 204R, the auxiliary light 205FL, the auxiliary light 205FR, the auxiliary light 205BL, the auxiliary light 205BR, the taillight 206L, the taillight 206R, the taillight 206CL, and the taillight 206CR are turned on.

At this time, as indicated by arrows A11 and A12 in the figure, the light is turned on as if light flows on a periphery of the body from a center of the front surface toward a center of the back surface of the body.

Specifically, first, the logo portions at the right end of the accessory light 201L and the left end of the accessory light 201R are lit for a while.

Next, the LEDs are sequentially turned on from the right end to the left end of the accessory light 201L. Next, the LEDs are sequentially turned on from the right end to the left end of the day running light 202L. Next, the LEDs are sequentially turned on from the front end to the rear end of the turn signal 204L. Next, the LEDs are sequentially turned on from the front end to the rear end of the auxiliary light 205FL. Next, the LEDs are sequentially turned on from the front end to the rear end of the auxiliary light 205BL. Next, the LEDs are sequentially turned on from the left end to the right end of the taillight 206L. Finally, the LEDs are sequentially turned on from the left end to the right end of the taillight 206CL. As a result, as indicated by arrow A11, each light is turned on as if light flows counterclockwise from the center of the front surface to the center of the back surface of the body.

Similarly, the LEDs are sequentially turned on from the left end to the right end of the accessory light 201R. Next, the LEDs are sequentially turned on from the left end to the right end of the day running light 202R. Next, the LEDs are sequentially turned on from the front end to the rear end of the turn signal 204R. Next, the LEDs are sequentially turned on from the front end to the rear end of the auxiliary light 205FR. Next, the LEDs are sequentially turned on from the front end to the rear end of the auxiliary light 205BR. Next, the LEDs are sequentially turned on from the right end to the left end of the taillight 206R. Finally, the LEDs are sequentially turned on from the right end to the left end of the taillight 206CR. As a result, as indicated by arrow A12, each light is turned on as if light flows clockwise from the center of the front surface to the center of the back surface of the body.

The turning on of lights counterclockwise and the turning on of lights clockwise are simultaneously performed.

Next, the loop light 256 and the main light 401 are turned on. At this time, the loop light 256 and the main light 401 are turned on to be gradually brighter entirely.

Then, when the turning on of the loop light 256 and the main light 401 is completed, a state illustrated in FIG. 21 is obtained.

Next, as illustrated in FIG. 22, some lights are turned off. At this time, as indicated by arrows A13 and A14 in the figure, the lights are sequentially turned off from the front of the left side surface and the front of the right side surface of the body to the center of the back surface.

Specifically, the LEDs are sequentially turned off from the front end to the rear end of the turn signal 204L. Next, the LEDs are sequentially turned off from the front end to the rear end of the auxiliary light 205FL. Next, the LEDs are sequentially turned off from the front end to the rear end of the auxiliary light 205BL. Next, the LEDs are sequentially turned off from the left end to the right end of the taillight 206L. Finally, the LEDs are sequentially turned off from the left end to the right end of the taillight 206CL. As a result, as indicated by arrow A13, the individual lights are sequentially turned off counterclockwise from the front of the left side surface to the center of the back surface of the body.

Similarly, the LEDs are sequentially turned off from the front end to the rear end of the turn signal 204R. Next, the LEDs are sequentially turned off from the front end to the rear end of the auxiliary light 205FR. Next, the LEDs are sequentially turned off from the front end to the rear end of the auxiliary light 205BR. Next, the LEDs are sequentially turned off from the right end to the left end of the taillight 206R. Finally, the LEDs are sequentially turned off from the right end to the left end of the taillight 206CR. As a result, as indicated by arrow A14, the individual lights are sequentially turned off clockwise from the front of the right side surface to the center of the back surface of the body.

The turning off of lights counterclockwise and the turning off of lights clockwise are simultaneously performed.

<During Driving and at Time of Turning-Off of Headlight 203>

Figure 23:
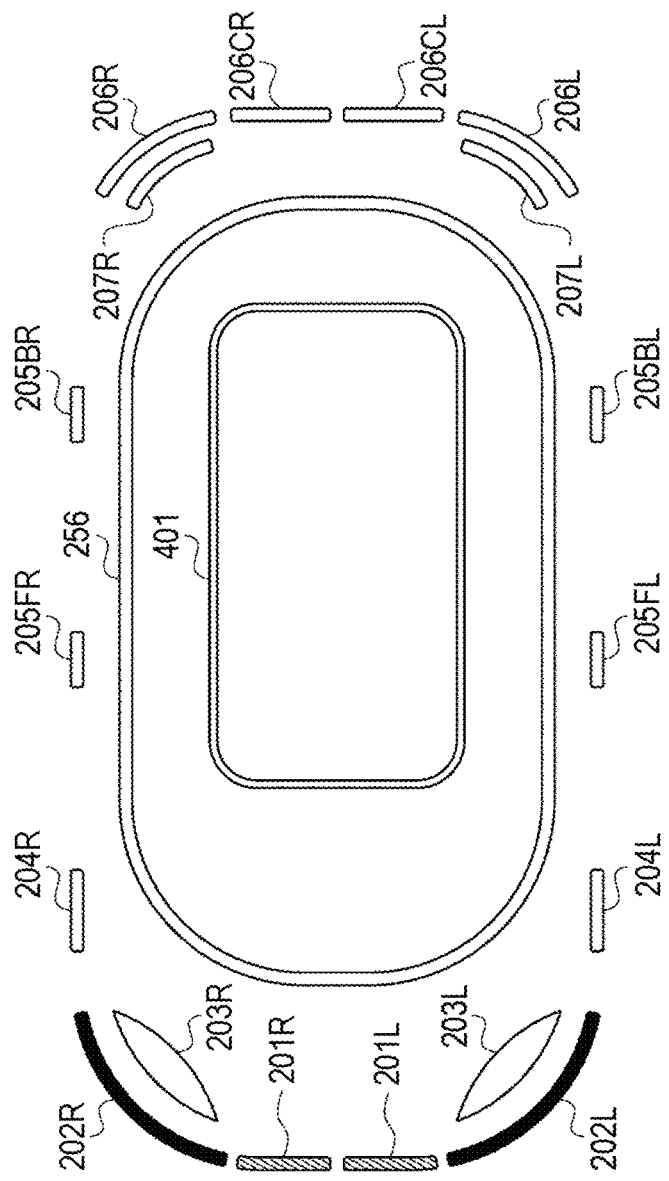
FIG. 23 is a view illustrating an example of a light emission pattern of a light during driving and when the headlight is turned off.

FIG. 23 illustrates an example of a light emission pattern in a case where the vehicle 1 is being driven (the shift position is set to driving or automatic driving) and the headlight 203 is turned off.

In this state, the accessory light 201L, the accessory light 201R, the day running light 202L, and the day running light 202R are turned on.

Note that the day running light 202L and the day running light 202R are turned on at all times during driving of the vehicle 1 due to limitations such as legal regulations. Whereas, the accessory light 201L and the accessory light 201R need to be darkened or turned off during driving of the vehicle 1 due to limitations such as legal regulations. Therefore, luminance of the accessory light 201L and the accessory light 201R is set to be lower than usual.

<During Driving and at Time of Turning-on of Headlight 203>

Figure 24:
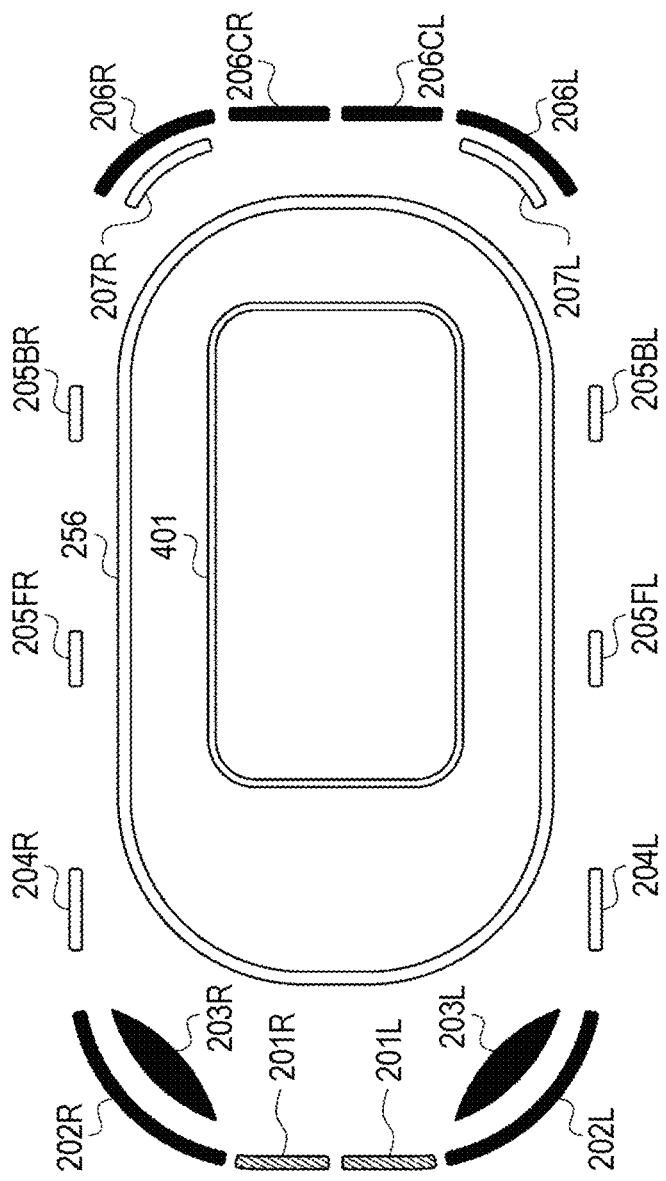

FIG. 24 illustrates an example of a light emission pattern in a case where the vehicle 1 is being driven (the shift position is set to driving or automatic driving) and the headlight 203 is turned on.

When FIG. 24 is compared with FIG. 23, there is a difference that the headlight 203L, the headlight 203R, the taillight 206L, the taillight 206R, the taillight 206CL, and the taillight 206CR are turned on. That is, the taillight 206L, the taillight 206R, the taillight 206CL, and the taillight 206CR are turned on in accordance with turning-on of the headlight 203L and the headlight 203R.

<At Time of Brake Operation>

Figure 25:
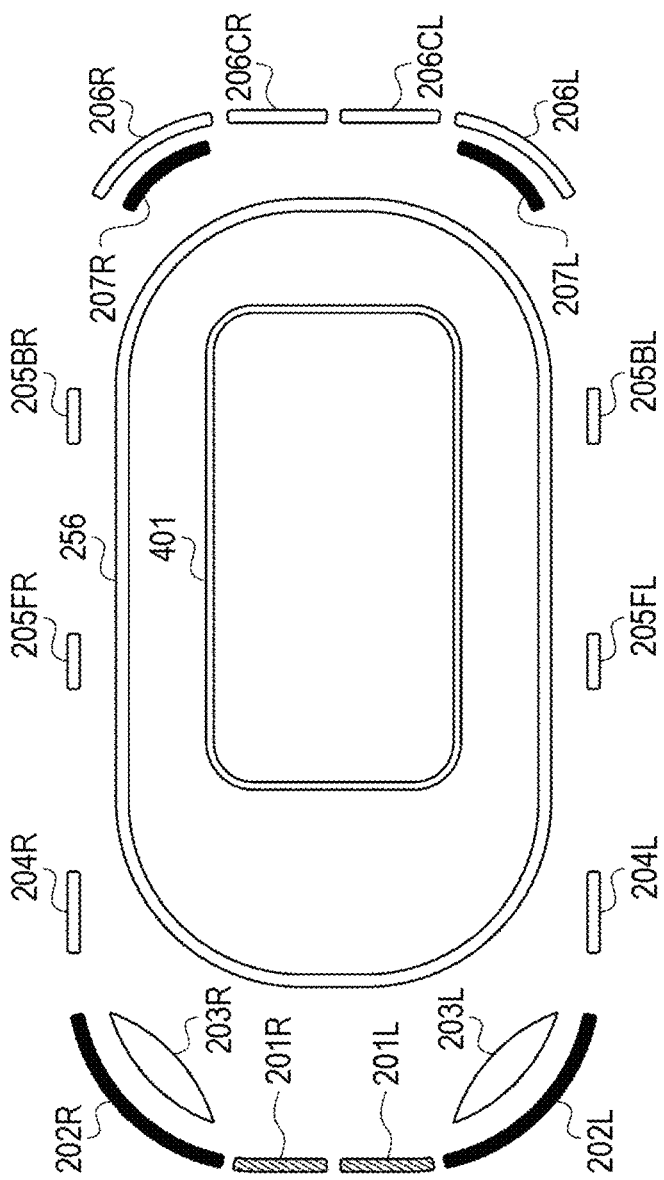
FIG. 25 is a view illustrating an example of a light emission pattern of a light at a time of brake operation.

FIG. 25 illustrates an example of a light emission pattern when the brake is operated.

When the state of FIG. 25 is compared with the state of FIG. 23, there is a difference that the brake light 207L and the brake light 207R are turned on. That is, when the brake is operated, the brake light 207L and the brake light 207R are turned on.

<At Time of Turn Signal Operation>

Figure 26:
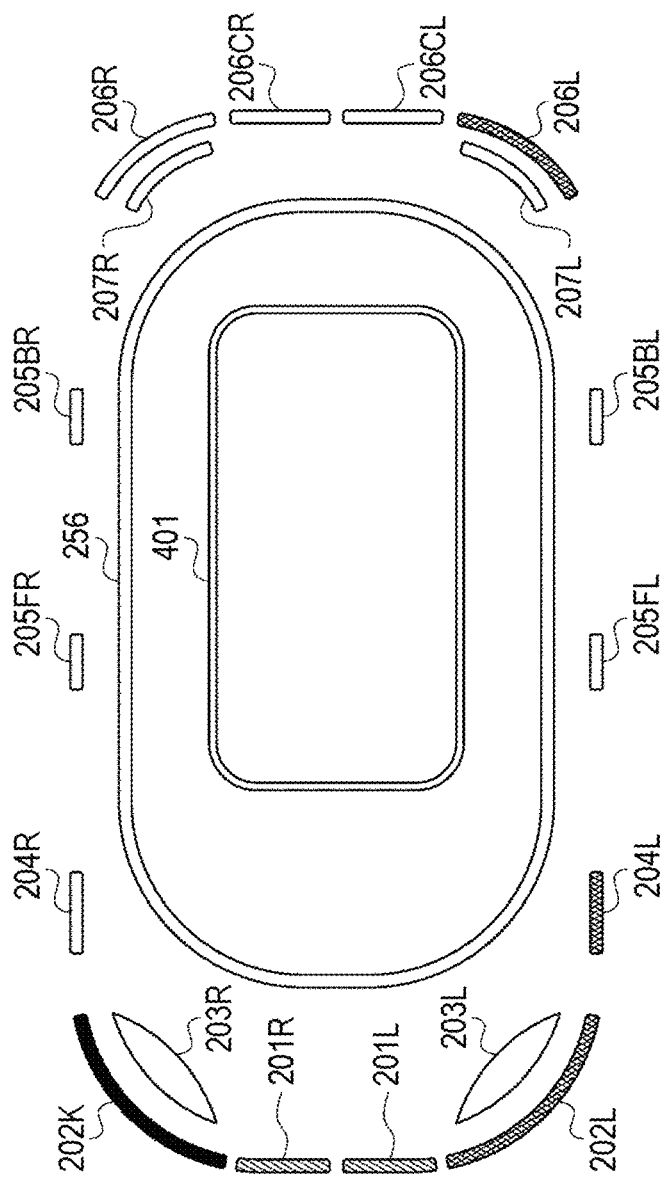
FIG. 26 is a view illustrating an example of a light emission pattern of a light at a time of a turn signal operation.

FIG. 26 illustrates an example of a light emission pattern in a case where a left-side turn signal is operating.

When FIG. 26 is compared with FIG. 23, there is a difference that colors of the day running light 202L and the taillight 206L change and the turn signal 204L blinks.

Specifically, the LEDs sequentially change from white to orange from the right end to the left end of the day running light 202L. After all the LEDs of the day running light 202L change to orange, the LEDs are sequentially turned on in orange from the distal end to the rear end of the turn signal 204L.

In parallel with this, the LEDs sequentially change from white to orange from the right end to the left end of the taillight 206L.

Next, the LEDs sequentially change from orange to white from the right end to the left end of the day running light 202L. After all the LEDs of the day running light 202L change to white, the LEDs are sequentially turned off from the distal end to the rear end of the turn signal 204L.

In parallel with this, the LEDs sequentially change from orange to white from the right end to the left end of the taillight 206L.

Hereinafter, a similar operation is repeated.

<In Case Where Door 212 is Open>

Figure 27:
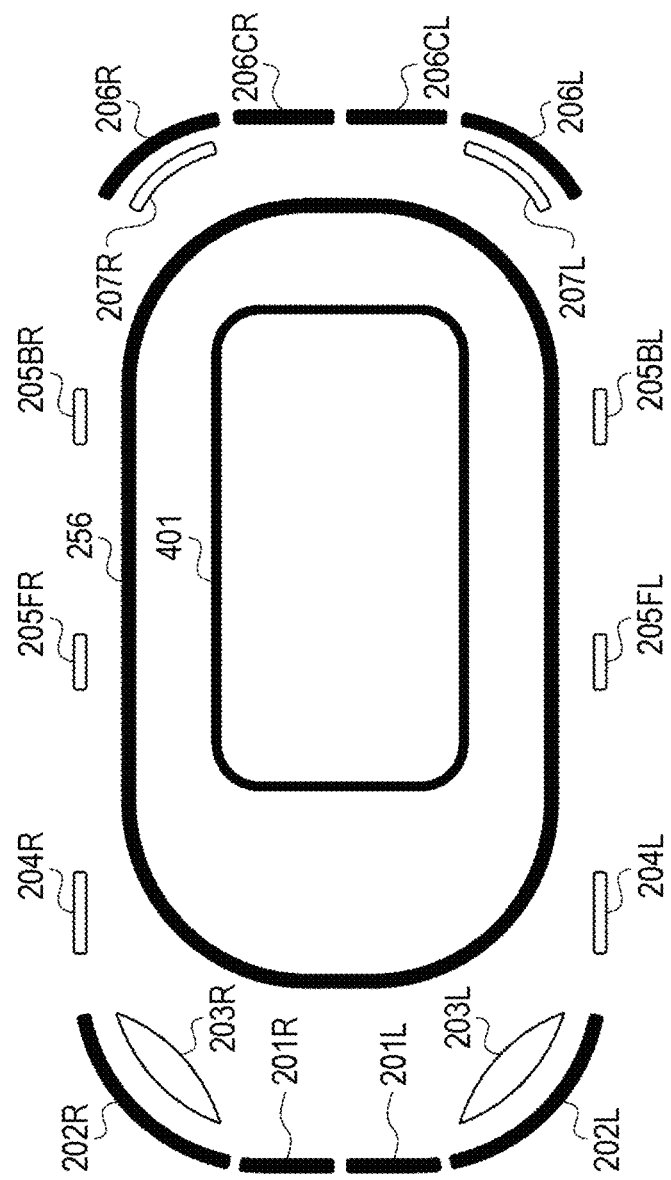
FIG. 27 is a view illustrating an example of a light emission pattern of a light when a door is open.

FIG. 27 illustrates an example of a light emission pattern in a case where any door 212 of the vehicle 1 is open.

At this time, the accessory light 201L, the accessory light 201R, the day running light 202L, the day running light 202R, the taillight 206L, the taillight 206R, the taillight 206CL, the taillight 206CR, the loop light 256, and the main light 401 are turned on.

<When Door 212 is Closed>

Figure 28:
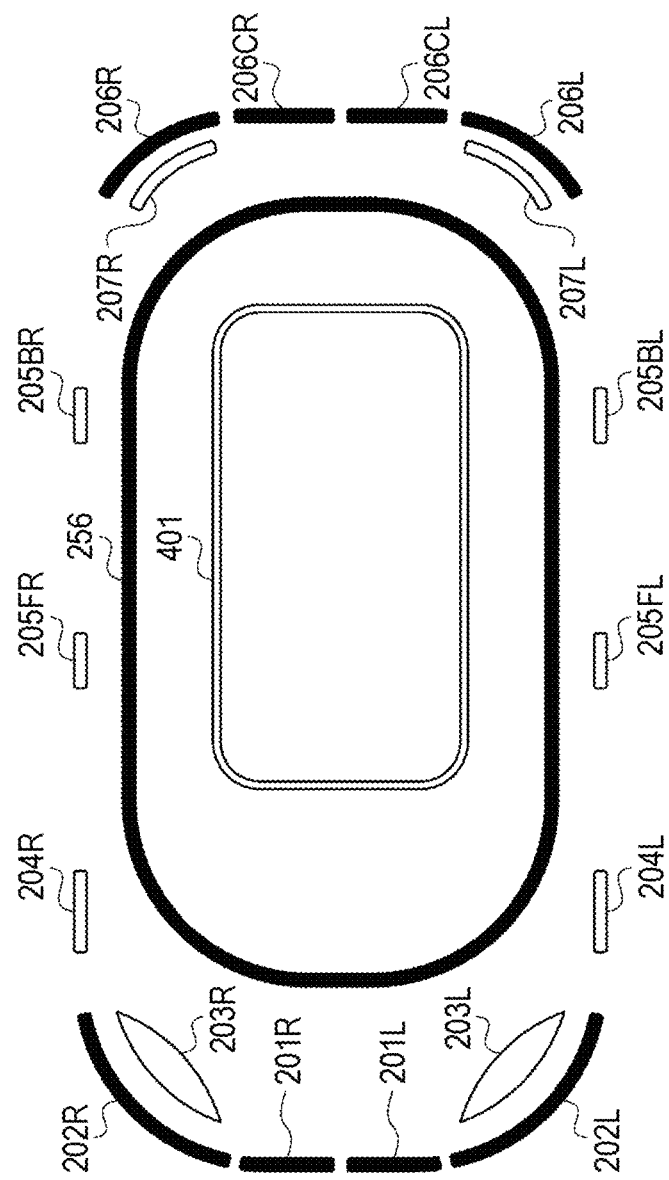
FIG. 28 is a view illustrating an example of a light emission pattern of a light when a door is closed.

FIG. 28 illustrates an example of a light emission pattern when a state where any door 212 of the vehicle 1 is changed to a state where all the doors 212 are closed.

Figure 29:
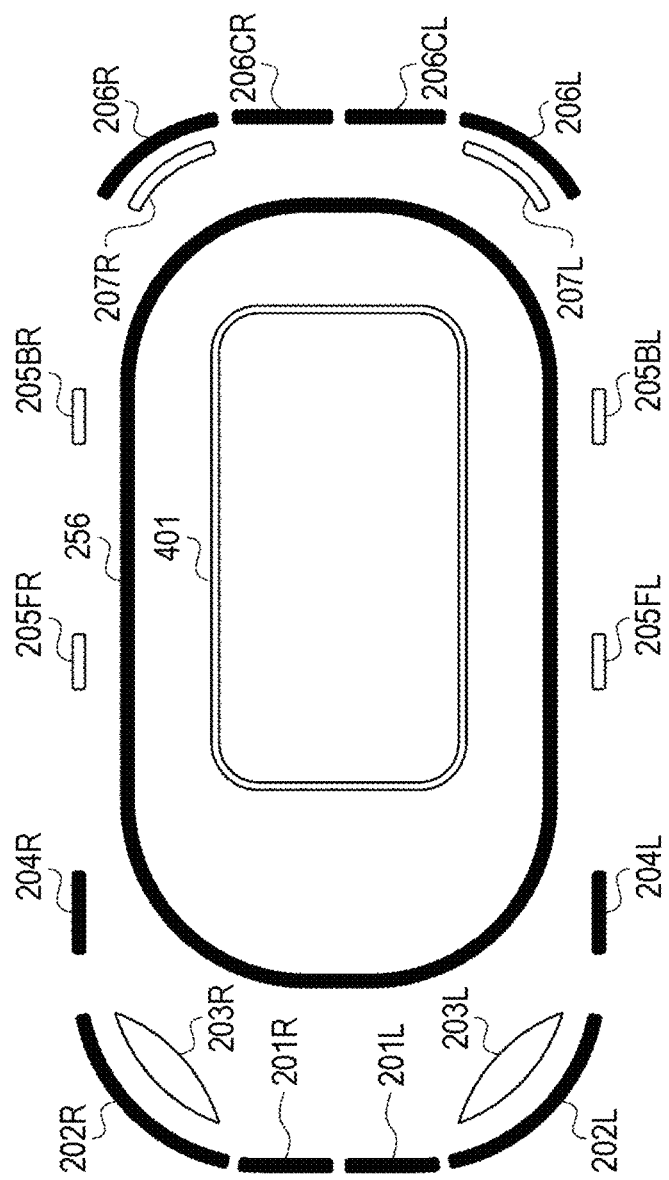
FIG. 29 is a view illustrating an example of a light emission pattern of a light at a time of parking.

When the state of FIG. 28 is compared with the state of FIG. 29, there is a difference that the main light 401 is turned off. That is, when the door 212 is closed, the main light 401 is turned off.

<At Time of Parking>

FIG. 29 illustrates an example of a light emission pattern in a case where the shift position of the vehicle 1 is set to parking.

In this case, the accessory light 201L, the accessory light 201R, the day running light 202L, the day running light 202R, the turn signal 204L, the turn signal 204R, the taillight 206L, the taillight 206R, the taillight 206CL, the taillight 206CR, and the loop light 256 are turned on.

<At Time of Power-Off>

Figure 30:
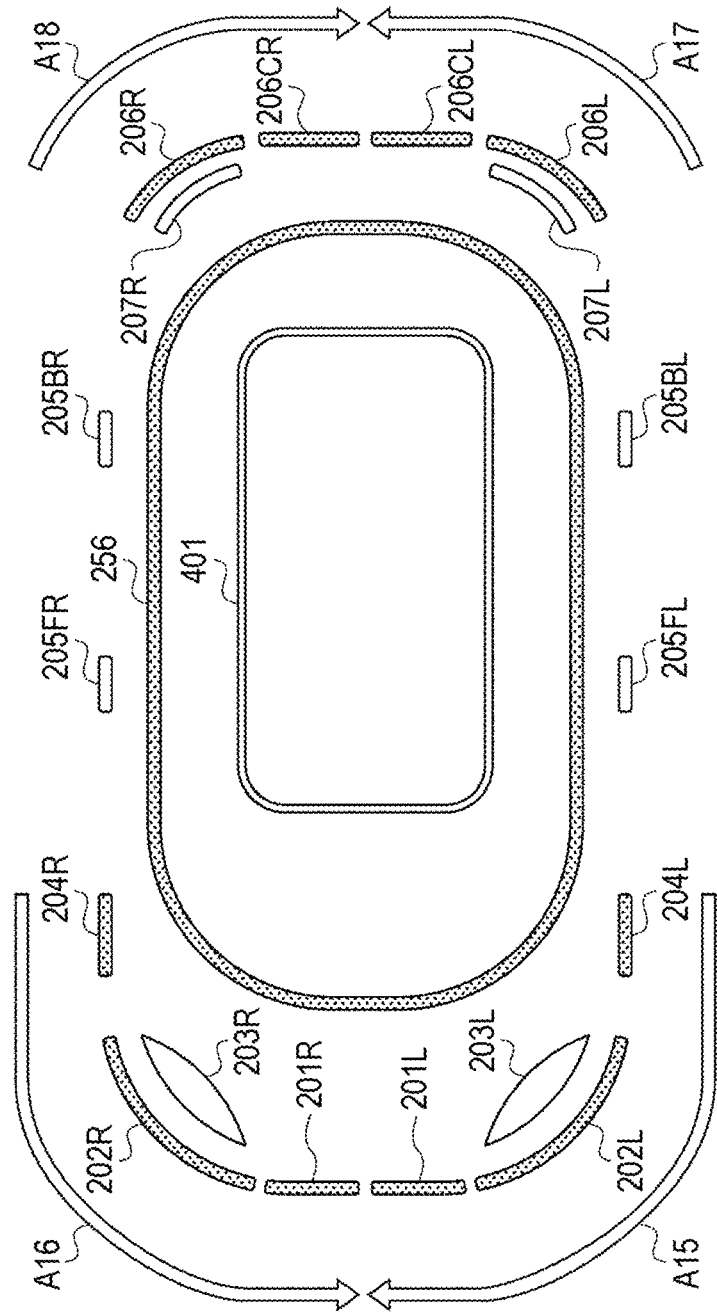
FIG. 30 is a view illustrating an example of a light emission pattern of a light at a time of power-off.

FIG. 30 illustrates an example of a light emission pattern when the power is turned off from a state where the shift position of the vehicle 1 is set to parking.

In this case, the accessory light 201L, the accessory light 201R, the day running light 202L, the day running light 202R, the turn signal 204L, the turn signal 204R, the taillight 206L, the taillight 206R, the taillight 206CL, the taillight 206CR, and the loop light 256 are turned off.

At this time, as indicated by arrows A15 and A16, the lights are turned off as if flowing from the side surfaces to the center of the front surface of the body. Furthermore, as indicated by arrows A17 and A18, the lights are turned off as if flowing from the side surfaces to the center of the back surface of the body.

Specifically, the LEDs are sequentially turned off from the rear end to the front end of the turn signal 204L. Next, the LEDs are sequentially turned off from the left end to the right end of the day running light 202L. Next, the LEDs are sequentially turned off from the left end to the right end of the accessory light 201L.

In parallel with this, the LEDs are sequentially turned off from the rear end to the front end of the turn signal 204R. Next, the LEDs are sequentially turned off from the right end to the left end of the day running light 202R. Next, the LEDs are sequentially turned off from the right end to the left end of the accessory light 201R.

In parallel with this, the LEDs are sequentially turned off from the left end to the right end of the taillight 206L. Next, the LEDs are sequentially turned off from the left end to the right end of the taillight 206CL.

In parallel with this, the LEDs are sequentially turned off from the right end to the left end of the taillight 206R. Next, the LEDs are sequentially turned off from the right end to the left end of the taillight 206CR.

Furthermore, the loop light 256 is gradually turned off.

<When Person Approaches Around Vehicle 1>

Next, although not illustrated, an example of a light emission pattern when the recognition unit 73 detects an approach of a person to the vehicle 1 will be described, for example.

For example, a light at a position close to an approaching person (near an approaching place) is turned on or blinks. Specifically, for example, when an approach of a person to the vicinity of the door 212FL is detected, the turn signal 204L and the auxiliary light 205FL, near the door 212FL are turned on or blink.

Moreover, for example, after the turn signal 204L and the auxiliary light 205FL are turned on, other lights may be sequentially turned on.

Furthermore, for example, in a case where an approach of a person is detected, the light may be always turned on or blink in a similar pattern regardless of the position where the person approaches. For example, the light may be turned on as if light flows around the vehicle.

Moreover, for example, a mode (for example, a color, a pattern, and the like) of turning-on or blinking of the light may be changed depending on a person who approaches. For example, in a case where the approaching person is recognized as a user (for example, a driver, a family member thereof, or the like) registered in advance, white light may blink. Whereas, for example, in a case where the recognition of the approaching person fails (in a case where the approaching person is not recognized as the user registered in advance), red light may blink.

Note that, for example, in a case where an approach of the registered user is detected, the body system control unit 84 may automatically unlock a door.

Furthermore, for example, a condition for turning on or blinking the light by an approach of a person may be limited. For example, only in a case where the power of the vehicle 1 is off or in a case where there is no person in the vehicle 1, the light may be turned on or blink by an approach of a person.

As described above, in a case where an approach of a person is detected, for example, by turning on or blinking an external light, a state where the vehicle 1 is monitoring the surroundings is appealed to the surroundings, and theft and destruction of the vehicle 1 can be prevented. Furthermore, in a case where an approach of a person is detected, for example, by turning on or blinking a light inside the vehicle, it is possible to appeal to the surroundings that the vehicle 1 is also monitoring the inside of the vehicle.

<Light Emission Pattern of Illumination 254 of Steering Wheel 253>

Next, a light emission pattern of the illumination 254 of the steering wheel 253 will be described.

For example, the light control unit 85 turns on or blinks the illumination 254 in a pattern according to a situation, on the basis of at least one of a situation of the vehicle 1, a situation around the vehicle 1, or a situation of the passenger. The light emission pattern of the illumination 254 is defined by, for example, at least one of a color, a brightness, a blinking pattern, a light movement, or a light emitting area.

Specifically, for example, when the vehicle 1 is ready for automatic driving, a plurality of short light bands makes about one rotation around the illumination 254. Then, the entire illumination 254 blinks. As a result, the driver can reliably recognize that automatic driving is ready.

Furthermore, for example, in a case where the vehicle 1 changes a lane by automatic driving, first, the entire illumination 254 is turned on. Thereafter, after the illumination 254 is turned off, the LED of the illumination 254 blinks in a direction in which the vehicle 1 moves for the lane change. Then, after the lane change is ended, the entire illumination 254 is turned on and then turned off. In this manner, the notification of the lane change is given from before the lane change until the lane change is completed, which makes it possible to give the passenger a sense of security.

Moreover, for example, in a case of calling the driver's attention due to approaching an obstacle, dozing, or the like, an upper portion of the illumination 254 blinks in red. As a result, the driver can quickly sense and avoid danger.

Furthermore, for example, in a case where voice recognition is performed, a plurality of light bands moves left and right in the upper portion of the illumination 254. As a result, the driver can recognize that the voice recognition function is normally operating.

<Image-Capturing Process>

Figure 31:
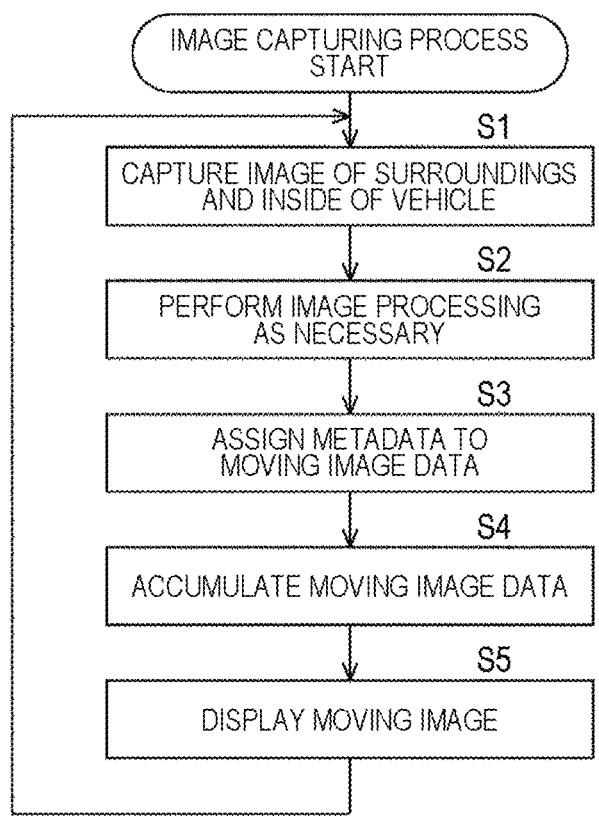
FIG. 31 is a flowchart for explaining an image-capturing process.

Next, an image-capturing process executed by the vehicle 1 will be described with reference to a flowchart of FIG. 31.

This process starts, for example, when the power of the vehicle 1 is turned on, and ends when the power of the vehicle 1 is turned off.

In step S1, the camera 51 captures an image of the surroundings and the inside of the vehicle 1.

Specifically, the camera 51 includes a plurality of cameras, and each camera captures an image of the surroundings or the inside (interior) of the vehicle 1. Each camera individually supplies moving image data obtained by the image-capturing, to the information processing unit 351.

In step S2, the image processing unit 361 performs image processing as necessary.

For example, the image processing unit 361 superimposes visual information on each frame of moving image data as described later with reference to FIGS. 32 to 35.

Furthermore, for example, the image processing unit 361 performs image processing such as noise cancellation on each frame of the moving image data, on the basis of sensor data from the in-vehicle sensor 26 and the vehicle sensor 27. For example, in a case where it is raining, the image processing unit 361 removes noise such as raindrops in the frame.

In step S3, the metadata assignment unit 362 assigns metadata to the moving image data.

For example, the metadata assignment unit 362 assigns metadata regarding at least one of an image-capturing place, an image-capturing date and time, a situation of the vehicle 1, a situation inside the vehicle, a surrounding situation, or the like to each piece of moving image data captured during movement or the like.

The metadata regarding the image-capturing place includes, for example, at least one of a position of the vehicle 1 at the time of image-capturing, an image-capturing direction, a position of a camera used for image-capturing, or the like.

The metadata regarding the image-capturing date and time includes, for example, at least one of a date, a time, or the like at the time of image-capturing.

The metadata regarding the situation of the vehicle 1 includes, for example, at least one of a speed, an acceleration, a traveling direction, a destination, or a state of the vehicle 1 (for example, a presence or absence of a fault, a presence or absence of an accident, a charging amount, or the like).

The metadata regarding the situation inside the vehicle includes, for example, identification information (for example, a name, an ID, and the like) of a passenger, a position of a seat of a passenger, a situation (for example, action contents, dozing, and the like) of a passenger, a voice recognition result of conversation inside the vehicle, a degree of activity inside the vehicle, and the like. The degree of activity is set on the basis of, for example, a volume of a conversation in the vehicle, a movement of a passenger, and the like.

The metadata regarding the surrounding situation includes, for example, at least one of weather, a temperature, a humidity, a brightness, a position and a type of a surrounding object (for example, another vehicle, a pedestrian, an obstacle, a traffic sign, a landmark, or the like), a presence or absence of occurrence and a type of an event (for example, an accident, construction, or the like), or the like.

Furthermore, for example, the metadata assignment unit 362 may assign metadata inputted by the user (a passenger) to the moving image data. For example, a movie button may be provided on the steering wheel 253, and the driver may press the movie button in a case where a scene or the like for which moving image data is desired to be stored is being captured. As a case where a scene or the like for which moving image data is desired to be stored is being captured, for example, a case where a landscape around the vehicle 1 is good, a case where a trouble such as an accident occurs, and the like are assumed. For example, the metadata assignment unit 362 assigns metadata indicating that storage is necessary, to moving image data captured in a period designated by the user using the movie button.

Note that a unit for assigning the metadata can be freely set. For example, metadata is assigned for each frame, for each unit including a plurality of frames, or for each piece of moving image data. Furthermore, the unit for assigning the metadata may be variable depending on a type of the metadata.

In step S4, the vehicle 1 accumulates moving image data. Specifically, the image processing unit 361 causes the recording unit 28 to store moving image data.

Note that, at this time, audio data recorded around and inside the vehicle 1 may be accumulated together with moving image data.

In step S5, the vehicle 1 displays a moving image. Specifically, the output control unit 363 causes the HMI 31 to display a moving image on the basis of moving image data.

For example, the moving images illustrated in FIGS. 32 to 35 are displayed on the center display 252.

Figure 32:
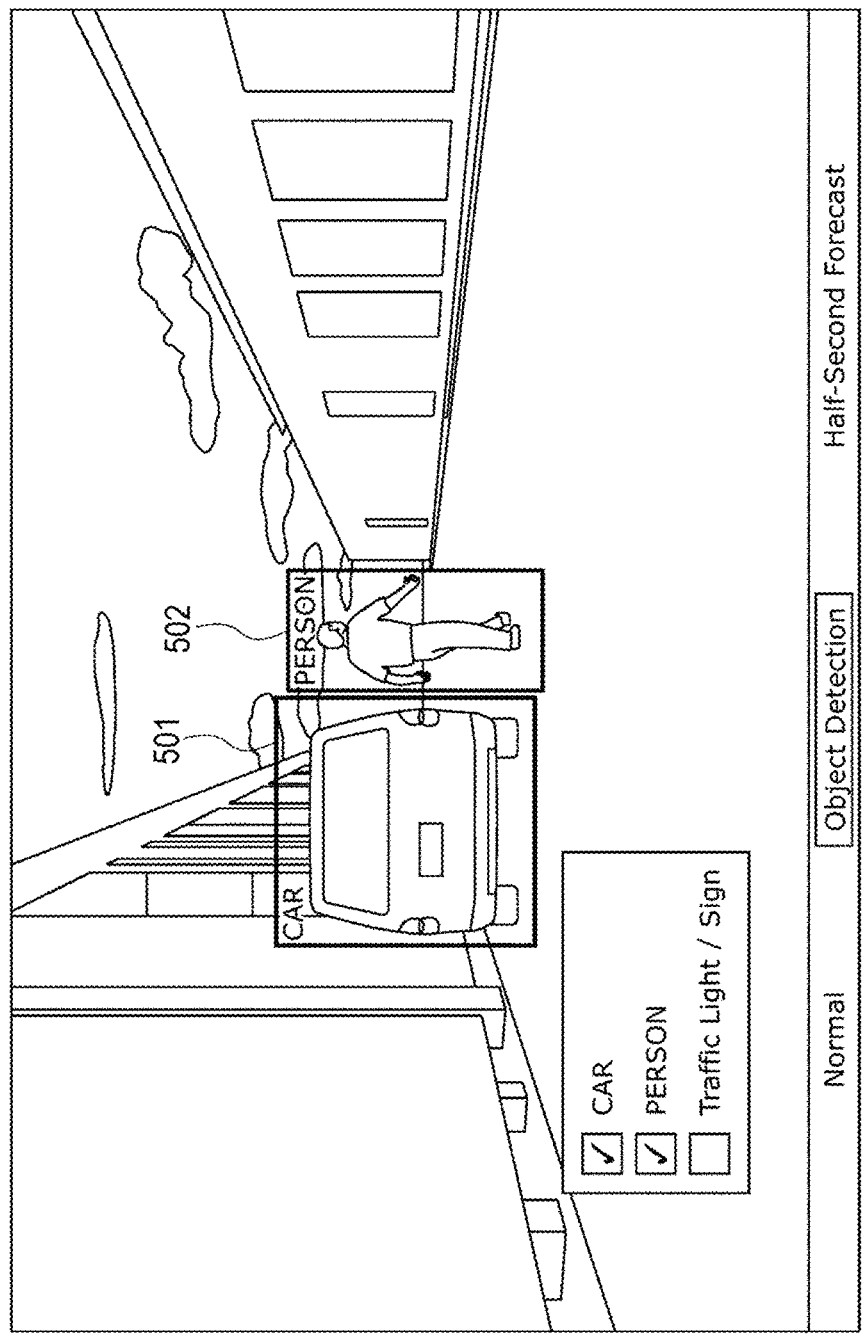
FIG. 32 illustrates an example of a moving image at a time of setting an object detection mode.

FIG. 32 illustrates an example of a moving image displayed in a case where a display mode is set to an object detection mode, for example. In this example, an example in which a vehicle and a person are selected as detection targets is illustrated. Then, a frame 501 surrounding the detected vehicle and a frame 502 surrounding the detected person are displayed in the moving image obtained by capturing an image in front of the vehicle 1. Furthermore, characters (CAR and PERSON) indicating the type of the detected object are displayed in the frame 501 and the frame 502.

Figure 33:
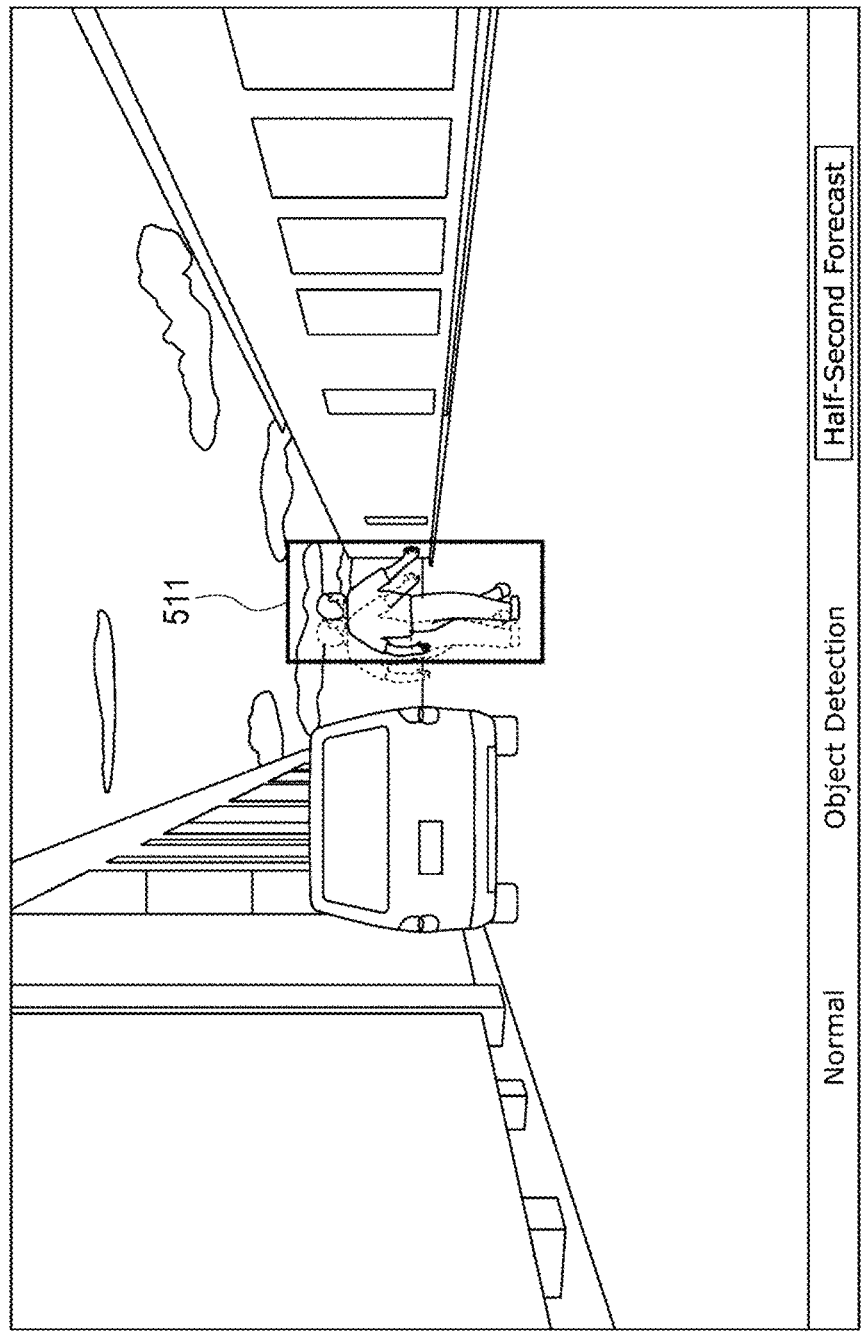
FIG. 33 illustrates an example of a moving image at a time of setting a forecast mode.

FIG. 33 illustrates an example of a moving image displayed in a case where the display mode is set to a forecast mode, for example. In this example, a forecasted position after 0.5 seconds of a moving object (in this example, a person) detected in the moving image is displayed. In this example, a current position of the person is indicated by a dotted line, and the forecasted position of the person after 0.5 seconds is indicated by a solid line and surrounded by a frame 511.

Figure 34:
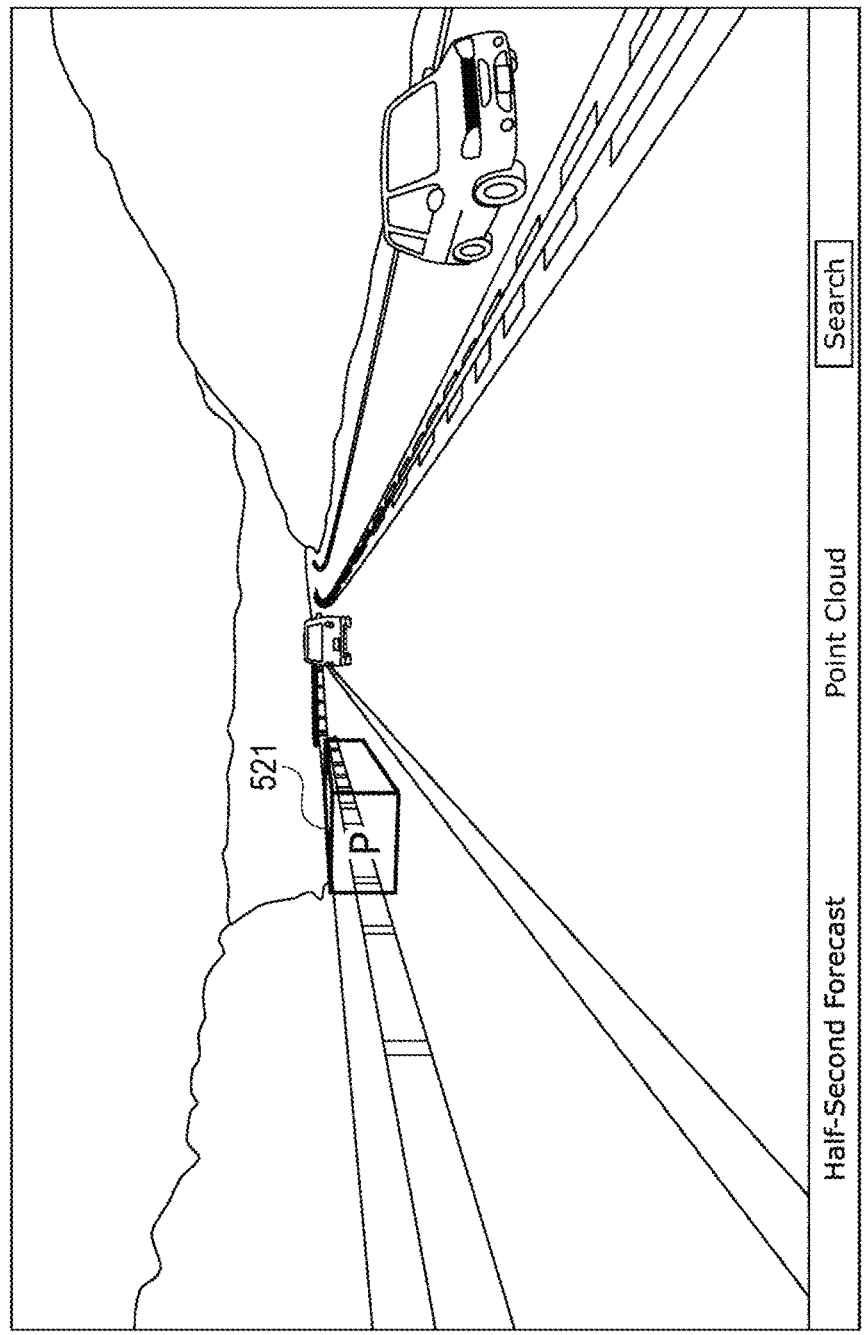
FIG. 34 illustrates an example of a moving image at a time of setting a search mode.

FIG. 34 illustrates an example of a moving image displayed in a case where the display mode is set to a search mode, for example. Here, an example of searching for and displaying a position where parking is possible is illustrated. Specifically, a frame 521 indicating the position where parking is possible is displayed.

Note that, for example, a plurality of positions where parking is possible may be displayed. Furthermore, for example, a position where parking is possible may be displayed by a bird's-eye view.

Figure 35:
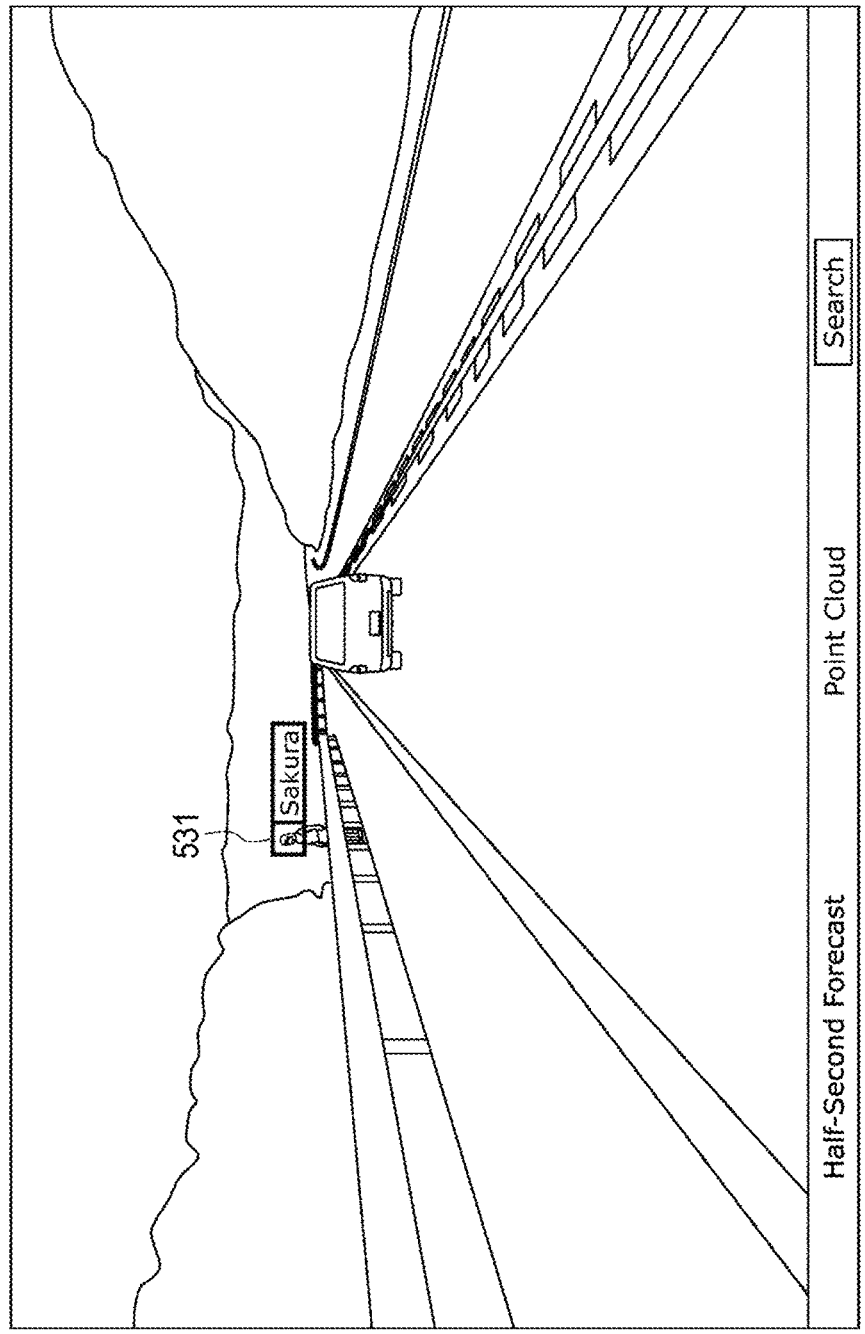
FIG. 35 illustrates an example of a moving image at a time of setting the search mode.

FIG. 35 illustrates an example of a moving image displayed in a case where the display mode is set to a find mode, for example. Here, an example is illustrated in which a person registered in advance is searched, and the detected person is displayed. Specifically, a frame 531 surrounding a person registered in advance is displayed in the moving image. Furthermore, a name (Sakura) of the detected person is displayed in the frame 531.

Note that, for example, a moving image in a direction (for example, forward, rearward, leftward, rightward, or the like) selected by a passenger such as the driver may be displayed on the center display 252. Furthermore, for example, a moving image of 360 degrees around the vehicle 1 may be displayed on the center display 252 while being scrolled.

Furthermore, for example, sensor data obtained by the radar 52 or the LiDAR 53 may be imaged and displayed on the center display 252. Furthermore, visual information based on data obtained by two or more types of sensors among the camera 51, the radar 52, and the LiDAR 53 may be superimposed and displayed on the moving image.

Moreover, for example, a traveling plan direction and the like may be superimposed and displayed on the moving image on the basis of a path planning.

Furthermore, for example, a motion of another vehicle forecasted by information or the like obtained by vehicle-to-vehicle communication may be superimposed and displayed on the moving image.

Thereafter, the process returns to step S1, and the processes of steps S1 to S5 are repeatedly executed.

<Moving Image Editing Process>

Figure 36:
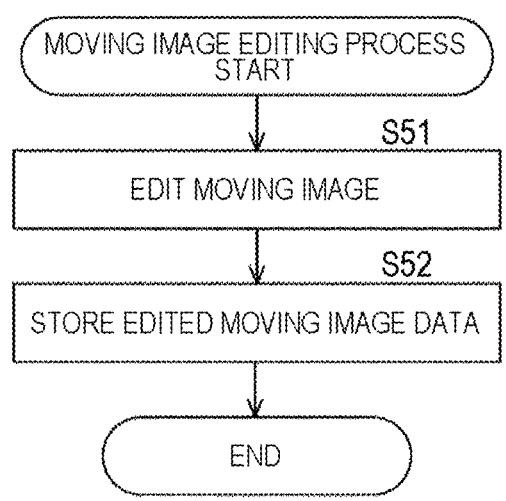
FIG. 36 is a flowchart for explaining an editing process.

Next, a moving image editing process executed by the vehicle 1 will be described with reference to FIG. 36.

This process is started, for example, when an instruction to edit a moving image is inputted to the HMI 31. The instruction to edit the moving image includes, for example, a period (hereinafter, referred to as an editing target period) in which the moving image as an editing target has been captured, a condition for extracting a frame to be included in the moving image, and the like.

In step S51, the image processing unit 361 edits a moving image.

For example, the image processing unit 361 extracts a frame to be included in moving image data after editing (hereinafter, referred to as edited moving image data) from each piece of moving image data captured within the editing target period (hereinafter, referred to as captured moving image data), on the basis of metadata or the like.

For example, the image processing unit 361 extracts a frame to which metadata indicating that storage is necessary is assigned.

Furthermore, for example, the image processing unit 361 extracts a frame that satisfies a given condition on the basis of the metadata.

For example, the image processing unit 361 extracts a frame on the basis of the metadata and a path of the vehicle 1 in the editing target period. For example, the image processing unit 361 detects the path of the vehicle 1 in the editing target period on the basis of map data and position information included in the metadata of the moving image data. Then, for example, in a case where the vehicle 1 is traveling on a road along the sea, the image processing unit 361 preferentially extracts a frame obtained by image-capturing in a direction of the sea. For example, in a case where the vehicle 1 is traveling on a high ground such as a mountain, the image processing unit 361 preferentially extracts a frame obtained by image-capturing in a direction looking down the surroundings. Moreover, for example, the image processing unit 361 preferentially extracts a frame obtained by image-capturing of a landmark or the like around the vehicle 1, on the basis of a traveling direction, a turning direction, and the like of the vehicle 1.

For example, the image processing unit 361 extracts a frame when a specific event occurs, on the basis of the metadata. For example, in a case where the vehicle 1 is involved in an accident or in a case where an accident occurs around the vehicle 1, the image processing unit 361 preferentially extracts a frame in time zones before and after the accident. Furthermore, for example, the image processing unit 361 preferentially extracts a frame obtained by image-capturing in a direction in which an accident has occurred.

For example, in a case where excitement in the vehicle is detected on the basis of a degree of activity included in the metadata, the image processing unit 361 preferentially extracts a frame obtained by image-capturing of the inside of the vehicle. Furthermore, for example, the image processing unit 361 also extracts audio data corresponding to the extracted frame in the vehicle.

Furthermore, for example, the output control unit 363 may cause the center display 252, the tablet terminal 264L, and the like to display a list of moving image data and an actual moving image, and the image processing unit 361 may edit the moving image on the basis of an instruction of the user.

For example, the user may select moving image data or frames desired to be included in the edited moving image data. In this case, for example, superimposition of visual information such as various types of information, visual effects, and scribble may be enabled on a frame of a moving image displayed on the center display 252, the tablet terminal 264L, or the like.

Then, the image processing unit 361 generates edited moving image data by combining the extracted frames, for example. For example, the image processing unit 361 generates edited moving image data by connecting extracted frames in time series, arranging or superimposing a plurality of frames in the same frame, or the like. Furthermore, the image processing unit 361 superimposes visual information on the extracted frame as necessary on the basis of the metadata, for example.

In step S52, the vehicle 1 stores the moving image data. For example, the image processing unit 361 causes the recording unit 28 to store the edited moving image data. Furthermore, for example, via the communication unit 22, the image processing unit 361 transmits the edited moving image data to a server or an information processing terminal (for example, a smartphone, a tablet terminal, a personal computer, or the like) owned by the passenger, to store.

Thereafter, the moving image editing process ends.

In this way, it is possible to easily edit the moving image obtained by capturing the surroundings and the inside of the vehicle 1. As a result, for example, moving image data in which memories of travel are recorded, moving image data in which scenes with good landscape are extracted, moving image data in which accident situations are recorded, and the like can be easily generated.

3. Modified Example

Hereinafter, a modified example of the above-described embodiment of the present technology will be described.

For example, captured moving image data before editing to which metadata is assigned may be stored or copied outside the vehicle 1, and a device (for example, a server (cloud), a smartphone, a tablet terminal, a personal computer, or the like) outside the vehicle 1 may edit the moving image. Furthermore, for example, a device outside the vehicle 1 and the vehicle 1 may cooperate to edit the moving image. Moreover, for example, the metadata may be assigned by a device outside the vehicle 1.

Furthermore, in the above description, an example has been described in which the front line and the tail line of the loop line L1 are illuminated. However, for example, in consideration of design, legal regulations, and the like, the front line and the tail line may not be illuminated.

Moreover, in the above description, an example has been described in which a central portion of the front line and a central portion of the tail line are divided. However, for example, the central portions may be connected with each other without being divided, in consideration of design and the like.

Furthermore, for example, an optical sensor such as a camera, a radar, or a LiDAR may be arranged in the headlight 203.

Moreover, in the above description, an example in which the vehicle 1 is a left-hand drive vehicle has been described, but needless to say that the present technology can also be applied to a right-hand drive vehicle. In a case where the present technology is applied to a right-hand drive vehicle, the above-described layout of the outside and inside of the vehicle is appropriately changed in accordance with a right-hand steering wheel.

Furthermore, a type of vehicle to which the present technology can be applied is not particularly limited. Furthermore, the present technology can also be applied to mobile devices such as personal mobility, airplanes, ships, construction machines, agricultural machines, and the like, in addition to vehicles. Furthermore, the mobile devices to which the present technology can be applied include, for example, a mobile device that captures an image of the surroundings without a person boarding, such as a drone or a robot.

4. Other

<Computer Configuration Example>
The series of processing described above can be executed by hardware or software. In a case where the series of processes are performed by software, a program that configures the software is installed in a computer (for example, the processor 21 or the like).

Note that the program executed by the computer may be a program that performs processing in a time series according to an order described in this specification, or may be a program that performs processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Moreover, the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)
A vehicle including:
a front line extending in a vehicle width direction on a front surface of a body; and
a headlight arranged on left and right of the front surface, divided vertically by the front line, and configured to output a low beam from a portion above the front line and output a high beam from a portion below the front line.

(2)
The vehicle according to (1) described above, in which the front line constitutes a part of a first loop line surrounding a periphery of the body.

(3)
The vehicle according to (2) described above, further including:
a plurality of lights arranged on a periphery of the body along the first loop line; and
a light control unit configured to control the plurality of lights.

(4)
The vehicle according to (3) described above, in which the light control unit turns on or blinks at least some of the plurality of lights in a case where a person approaches the vehicle.

(5)
The vehicle according to (4) described above, in which the light control unit turns on or blinks a light among the lights at a position close to the person.

(6)
The vehicle according to (4) or (5) described above, in which the light control unit changes a mode of turning on or blinking a light among the lights depending on the person.

(7)
The vehicle according to any one of (4) to (6) described above, further including:
a body system control unit configured to unlock a door in a case where the person is registered in advance.

(8)
The vehicle according to any one of (3) to (7) described above, further including:
a loop light surrounding at least a part of an inside of the vehicle at a substantially same height as the first loop line, in which
the light control unit performs cooperative control on the plurality of lights and the loop light.

(9)
The vehicle according to any one of (3) to (8) described above, in which
the front line includes a front light extending in a vehicle width direction on a front surface.

(10)
The vehicle according to (9) described above, in which the front light is divided at a center, and an optical sensor is arranged at a divided portion.

(11)
The vehicle according to (10) described above, in which the divided portion constitutes a part of a logo.

(12)
The vehicle according to any one of (3) to (11) described above, in which
the plurality of lights includes a taillight extending in a vehicle width direction on a back surface of the body.

(13)
The vehicle according to (12) described above, further including:
a brake light arranged on left and right of the back surface and divided vertically by the taillight.

(14)
The vehicle according to (12) or (13) described above, in which
the taillight is divided at a center, and an optical sensor is arranged at a divided portion.

(15)
The vehicle according to (14) described above, in which the divided portion constitutes a part of a logo.

(16)
The vehicle according to any one of (3) to (15) described above, in which
the plurality of lights includes a turn signal.

(17)
The vehicle according to any one of (2) to (16) described above, in which
an optical sensor is arranged near an intersection of the first loop line and an extension line of an A pillar or an extension line of a C pillar.

(18)
The vehicle according to (17) described above, in which the optical sensor includes a LiDAR.

(19)
The vehicle according to (17) or (18) described above, in which
a turn signal is arranged above the optical sensor arranged near an intersection of the first loop line and the extension line of the A pillar.

(20)
The vehicle according to any one of (2) to (19) described above, in which
a door knob is arranged near the first loop line on a side surface of the body.

(21)

The vehicle according to (20) described above, further including:

a communication device arranged at the door knob or near the door knob and configured to perform short-range wireless communication.

(22)

The vehicle according to (21) described above, further including:

an auxiliary light configured to illuminate vicinity of the door knob.

(23)

The vehicle according to any one of (2) to (22) described above, further including:

a second loop line surrounding a periphery of the body along a lower end of a window provided in the body.

(24)

The vehicle according to (23) described above, in which a color of the body is different between above and below the second loop line.

(25)

The vehicle according to any one of (1) to (24) described above, in which an end portion of the front line is curved rearward of the body and extends in a direction penetrating the body.

(26)

The vehicle according to any one of (1) to (25) described above, further including:

an optical sensor arranged between portions of a logo arranged at a center of the front line.

(27)

The vehicle according to any one of (1) to (26) described above, further including:

an optical sensor installed in the headlight.

Note that the effects described in this specification are merely examples and are not limited, and other effects may be present.

REFERENCE SIGNS LIST

1 Vehicle
11 Vehicle control system
21 Processor
31 HMI
51 Camera
52 Radar
53 LiDAR
73 Recognition unit
84 Body system control unit
85 Light control unit
201 Accessory light
202 Day running light
203 Headlight
204 Turn signal
205 Auxiliary light
206 Taillight
207 Brake light
252 Center display
253 Steering wheel
254 Illumination
255FL to BR Speaker
256 Loop light
257 Stalk lever
258 Button
259 Indicator
260FC to 260FR  Blowing port
261CL to 261FR  Knob
262 Operation unit
263FL, 263FR  Door opener
265 Tablet terminal
265 Digital room mirror REFERENCE SIGNS LIST -continued 266 Attachment part
351 Information processing unit
361 Image processing unit
362 Metadata assignment unit
363 Output control unit
401 Main light

The invention claimed is:

1. A vehicle comprising:
a body having a front surface;
a front line extending in a vehicle width direction on the front surface of the body;
a headlight arranged on left and right of the front surface, divided vertically by the front line, and configured to output a low beam from a portion above the front line and output a high beam from a portion below the front line;
a plurality of lights;
a light control unit configured to control the plurality of lights;
an external recognition sensor including at least one of a camera, a radar, a light detection and ranging (LiDAR) and an ultrasonic sensor; and
a recognition unit configured to perform detection processing and recognition processing based on an output from the external recognition sensor, wherein
the light control unit is configured to:
turn on or blink at least one of the plurality of lights in response to the recognition unit detecting a person approaching the vehicle, and
change a mode of turning on or blinking the at least one of the plurality of lights depending on the person, and
the mode includes at least a color and a pattern of the light.

2. The vehicle according to claim 1, wherein
the front line constitutes a part of a first loop line surrounding a periphery of the body, and
the first loop line is a virtual line.

3. The vehicle according to claim 2, wherein
the plurality of lights are arranged on a periphery of the body along the first loop line.

4. The vehicle according to claim 3, further comprising:
a door; and
a body system control unit configured to unlock the door in response to the person being registered in advance.

5. The vehicle according to claim 3, further comprising:
a loop light surrounding at least a part of an inside of the vehicle at a substantially same height as the first loop line, wherein
the light control unit performs cooperative control of the plurality of lights and the loop light.

6. The vehicle according to claim 3, wherein
the front line includes a front light extending in the vehicle width direction on the front surface.

7. The vehicle according to claim 6, wherein
the front light is divided at a center, and the external recognition sensor is arranged at a divided portion of the front light.

8. The vehicle according to claim 7, further comprising a logo disposed on the body, wherein
the divided portion constitutes a part of the logo.

9. The vehicle according to claim 3, wherein
the plurality of lights includes a taillight extending in the vehicle width direction on a back surface of the body.

10. The vehicle according to claim 9, further comprising:
a brake light arranged on left and right sides of the back surface and divided vertically by the taillight.

11. The vehicle according to claim 9, wherein
the taillight is divided at a center, and the external recognition sensor is arranged at a divided portion of the taillight.

12. The vehicle according to claim 11, further comprising a logo disposed on the body, wherein
the divided portion of the taillight constitutes a part of the logo.

13. The vehicle according to claim 3, wherein
the plurality of lights includes a turn signal.

14. The vehicle according to claim 1, wherein
the light control unit is configured to turn on or blink at least one of the plurality of lights closest to the person approaching the vehicle.

15. The vehicle according to claim 2, further comprising:
an A pillar; and
a C pillar; wherein
the external recognition sensor is arranged near an intersection of the first loop line and an extension line of the A pillar or an extension line of the C pillar.

16. The vehicle according to claim 15, wherein
the external recognition sensor includes the LiDAR.

17. The vehicle according to claim 15, further comprising
a turn signal arranged above the external recognition sensor, wherein
the external recognition sensor is arranged near an intersection of the first loop line and the extension line of the A pillar.

18. The vehicle according to claim 2, further comprising:
a door knob arranged near the first loop line on a side surface of the body.

19. The vehicle according to claim 18, further comprising:
a communication device arranged at the door knob or near the door knob, wherein
the communication device is configured to perform short-range wireless communication.

20. The vehicle according to claim 19, further comprising:
an auxiliary light configured to illuminate a vicinity of the door knob.

21. The vehicle according to claim 2, further comprising:
a window disposed in the body; and
a second loop line surrounding a periphery of the body along a lower end of the window.

22. The vehicle according to claim 21, wherein
a color of the body is different between above and below the second loop line.

23. The vehicle according to claim 1, wherein
an end portion of the front line is curved rearward of the body and extends in a direction penetrating the body.

24. The vehicle according to claim 1, further comprising a logo disposed on the body, wherein
the external recognition sensor is arranged between portions of the logo arranged at a center of the front line.

25. The vehicle according to claim 1, wherein
the external recognition sensor is installed in the headlight.

* * * * *